United States Patent
Bruguier et al.

(10) Patent No.: US 11,356,594 B1
(45) Date of Patent: Jun. 7, 2022

(54) TILTED SLIT CONFOCAL SYSTEM CONFIGURED FOR AUTOMATED FOCUS DETECTION AND TRACKING

(71) Applicant: KLA Corporation, Milpitas, CA (US)

(72) Inventors: Brooke Bruguier, San Jose, CA (US); Xiumei Liu, Fremont, CA (US); Qiang Q. Zhang, San Jose, CA (US); Stephen Taylor, Milpitas, CA (US)

(73) Assignee: KLA Corporation, Milpitas, CA (US)

( * ) Notice: Subject to any disclaimer, the term of this patent is extended or adjusted under 35 U.S.C. 154(b) by 86 days.

(21) Appl. No.: 16/995,681

(22) Filed: Aug. 17, 2020

Related U.S. Application Data

(60) Provisional application No. 62/893,404, filed on Aug. 29, 2019.

(51) Int. Cl.
| | |
|---|---|
| *H04N 5/232* | (2006.01) |
| *G02B 7/28* | (2021.01) |
| *G02B 7/34* | (2021.01) |
| *G01N 21/95* | (2006.01) |

(52) U.S. Cl.
CPC ..... *H04N 5/23212* (2013.01); *G01N 21/9501* (2013.01); *G02B 7/282* (2013.01); *G02B 7/34* (2013.01)

(58) Field of Classification Search
CPC ........... G01N 21/9501; H04N 5/23212; G02B 7/282; G02B 7/34
USPC ............. 356/237.1–237.6, 239.1–239.8
See application file for complete search history.

(56) References Cited

U.S. PATENT DOCUMENTS

| | | | |
|---|---|---|---|
| 4,639,587 | A | 1/1987 | Chadwick et al. |
| 6,172,349 | B1 | 1/2001 | Katz et al. |
| 6,288,382 | B1 | 9/2001 | Ishihara |
| 6,838,650 | B1 | 1/2005 | Toh |
| 7,136,149 | B2 | 11/2006 | Mickan et al. |
| 7,142,315 | B1 | 11/2006 | Lange et al. |
| 7,692,879 | B2 | 4/2010 | Steinert et al. |
| 8,643,835 | B2 | 2/2014 | Young et al. |
| 2012/0038979 | A1 | 2/2012 | Hing et al. |
| 2020/0319443 | A1 | 10/2020 | Liu et al. |

FOREIGN PATENT DOCUMENTS

| | | |
|---|---|---|
| CN | 106772923 A | 5/2017 |
| EP | 1393116 B1 | 12/2005 |

*Primary Examiner* — Tri T Ton
(74) *Attorney, Agent, or Firm* — Suiter Swantz pc llo

(57) ABSTRACT

A system for automated focus tracking of a sample is disclosed. The system comprises an illumination source, a set of illumination optics in an illumination path, a set of collection optics in a collection path, a first slit device in the illumination path, a second slit device in the collection path, at least one detector configured to generate an image of the sample, and a controller configured to receive through-focus information from the image, and provide corrective motion to a stage holding the sample to maintain a position of the sample at a selected focus. A method for automated focus tracking of a sample is also disclosed.

35 Claims, 27 Drawing Sheets

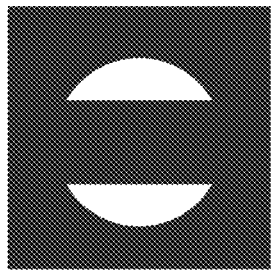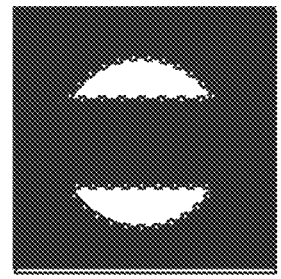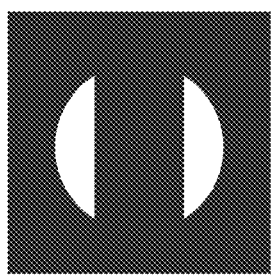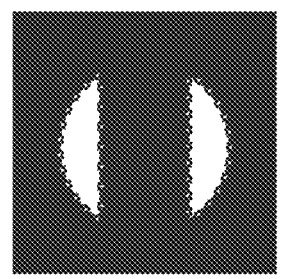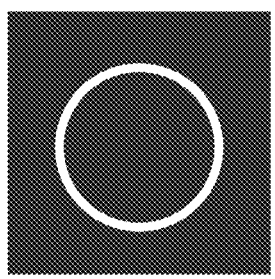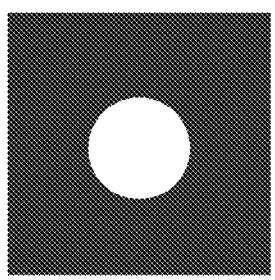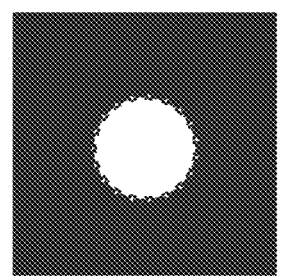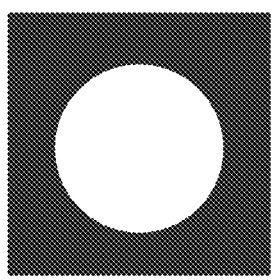
FIG. 9A
FIG. 9B

TILTED SLIT CONFOCAL SYSTEM CONFIGURED FOR AUTOMATED FOCUS DETECTION AND TRACKING

CROSS-REFERENCE TO RELATED APPLICATION

The present application claims the benefit under 35 U.S.C. § 119(e) of the following applications: U.S. Provisional Patent Application Ser. No. 62/893,404, filed Aug. 29, 2019, entitled TILTED SLIT CONFOCAL SYSTEM CONFIGURED FOR AUTOMATED FOCUS DETECTION AND TRACKING, naming Brooke Bruguier, Xiumei Liu, Qiang Q. Zhang, and Stephen Taylor as inventors. The foregoing application is incorporated herein by reference in the entirety.

TECHNICAL FIELD

The present disclosure relates generally to imaging and detecting defects in semiconductor wafers (e.g., 3-D NAND wafers) and photomasks. More particularly, the present disclosure relates to a system configured for automated focus detection and tracking, and for the detection of the distance and direction of the system's best focal plane (BFP) with respect to a sample under test (SUT).

SUMMARY

An optical characterization system for automated focus tracking of a sample is disclosed in accordance with one or more illustrative embodiments of the present disclosure. In one illustrative embodiment, the system comprises an illumination source, a set of illumination optics in an illumination path, a set of collection optics in a collection path, a first slit device in the illumination path, wherein the first slit device is at a first conjugate focal plane with respect to the sample, a second slit device in the collection path, wherein the second slit device is at a second conjugate focal plane with respect to the sample, at least one detector configured to generate an image of the sample, wherein the image includes data associated with the first slit device and the second slit device, and a controller configured to be communicatively coupled with the at least one detector, the controller including one or more processors configured to execute program instructions causing the one or more processors to: receive through-focus information from the data associated with the first slit device and the second slit device, and provide corrective motion to a stage holding the sample to maintain a position of the sample at a selected focus (e.g., a focus offset of zero or a selected non-zero value).

A method for automated focus tracking of a sample is disclosed in accordance with one or more illustrative embodiments of the present disclosure. In one illustrative embodiment, the method comprises receiving through-focus information from an image of the sample generated by at least one detector of an optical characterization subsystem. The optical characterization subsystem comprises an illumination source, a set of illumination optics in an illumination path, a set of collection optics in a collection path, a first slit device in the illumination path, wherein the first slit device is at a first conjugate focal plane with respect to the sample, a second slit device in the collection path, wherein the second slit device is at a second conjugate focal plane with respect to the sample, and the at least one detector configured to generate the image of the sample, wherein the image includes data associated with the first slit device and the second slit device. The method further comprises providing corrective motion to a stage holding the sample to maintain a position of the sample at a selected focus (e.g., a focus offset of zero or a selected non-zero value).

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF DRAWINGS

The numerous advantages of the disclosure may be better understood by those skilled in the art by reference to the accompanying figures in which:

FIGS. 9A-9B illustrate various pupil aperture shapes to prevent cross-talk, in accordance with one or more embodiments of the present disclosure.

DETAILED DESCRIPTION

Figure 1:
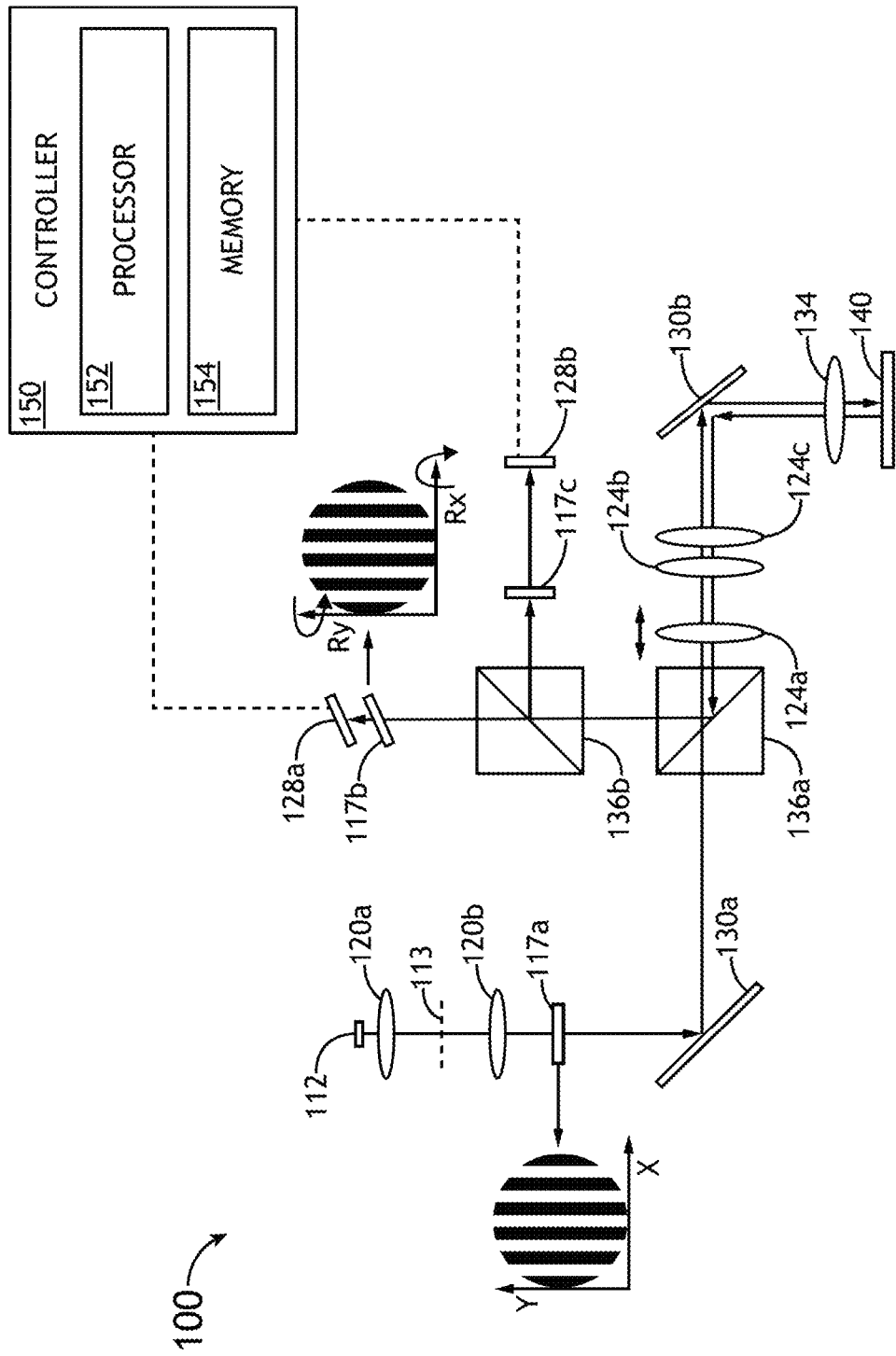
FIG. 1 is a schematic view illustrating an optical characterization system, in accordance with one or more embodiments of the present disclosure.

The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure. Reference will now be made in detail to the subject matter disclosed, which is illustrated in the accompanying drawings.

The present disclosure is directed to a semiconductor wafer inspection system configured for automated focus detection and tracking. In particular, the present disclosure is directed to the detection of the distance and direction of the system's best focal plane (BFP) with respect to a sample under test (SUT). The system may include a pair of confocal slit devices (e.g., a device with one or more slits) with a relative tilt in the illumination path or the collection path. Each of the slit devices may comprise a single slit, or a slit array (e.g., multiple slits spaced at a set distance apart). The confocal slit devices may be placed in both the illumination path and the collection path. The confocal slit devices may lie in-and-out of the focal plane of the system to introduce a continuous focus offset across the field in one set of slits. In this way, continuous through-focus information may be collected without introducing any physically moving components.

This through-focus information may be processed to provide a distance and direction to the BFP with respect to the SUT. This distance may be an error signal that is fed into a closed loop control system to produce corrective motion in the SUT and to always maintain the sample position at a selected focus (e.g., a focus offset of zero or a selected non-zero value), thus enabling automated focus (AF) tracking to the surface of the SUT. Alternatively, if the error signal is recorded, a distance may be measured between the BFP and SUT surface. Additionally, when used as an AF system, the control loop may be configured to enable the tracking of samples at a virtual plane which may be offset from the SUT top surface.

The present disclosure may be configured to inspect semiconductor wafers (e.g., 3-D NAND wafers) and/or photomasks. However, the present invention is not limited thereto, and may be utilized in any application where AF methods are desirable (e.g., biomedical microscopy, machine vision, etc.). The SUT is not limited to a single surface reflection and may involve multiple surfaces reflecting light into the collection path. The present disclosure may also enable the tracking of the optical thickness of physically planar samples. For instance, if a glass plate thickness is uniform across a large area, the refractive index may be calculated based on the measured error signal. Conversely, if the refractive index is uniform, the physical thickness of the glass plate may be calculated.

A conventional method for automated focus is described in U.S. Pat. No. 4,639,587, which is incorporated herein by reference in its entirety. The conventional method uses an image of a one-dimensional projection mask with alternating opposing illumination from two channels. The reflected image moves in a direction determined by the focus offset of the sample (e.g., wafer) and the channel of illumination, and a return mask modulates the relative integrated signal from the two channels. The signals are combined to produce an S-curve from plotting the Normalized Sum Curve, $NSC=F_a/N_a-F_b/N_b$. $F_a$ and $F_b$ are focus signal levels after the return mask from channels a and b, respectively. $N_a$ and $N_b$ are the corresponding normalization signal levels for each channel. Focus is achieved when the signals from both channels are balanced and the NSC signal equals 0. The sign of the NSC indicates the direction of movement required to return to focus (e.g., move the wafer up or down). The conventional method includes a movable focusing lens to adjust to a configurable focus offset in the sample space and enables inspection at a controlled offset in the Z direction.

Conventional methods for automated focus present several disadvantages. One disadvantage is related to process variation in wafers. For example, the stack thickness in 3-D NAND may be 2-12 µm, and may be typically formed by oxide & silicon nitride thin film pairs. For optical-based wafer inspection, conventional AF methods shift focus with process variation. For instance, for a channel-hole etch-process step, a desirable channel-hole has a cylindrical shape through the wafer Z stack. However, process variation can cause certain regions of the wafer to have tapered channel holes or channel hole size variation. In other words, even though the wafer physical thickness is the same, the conventional AF methods can shift the wafer surface in and out of the BFP depending on the severity of process variation. This shifting, in turn, causes loss of defect detection sensitivity. Additionally, conventional AF methods are also sensitive to wafer patterns. For instance, there may be an unpatterned region (typically 5-30 µm wide) in the middle of a channel etched array. The unpatterned region can cause focus shifts of 100-400 nm, depending on pattern brightness and pattern width. Both issues can result in inconsistent focusing and the loss of defect detection sensitivity across the whole wafer.

Another significant disadvantage of conventional AF methods relates to the loss of focus on customer wafers with process-of-record (POR) AF settings. This loss of focus is caused by diffractive wafer patterns and results in a severe reduction of the linear range of the S-curve when AF light penetrates below the wafer surface. The linear range of the S-curve may be the actual usable range of the S-curve for data extraction. In some cases, no defects may be detected in the top or bottom portion of a wafer at all. Additionally, to inspect for defects at the very bottom of thick wafer stacks (e.g., up to ~30 um), a focusing lens in the POR AF system needs to support a large Z adjustment range with high resolution. This adjustment range may be very difficult to engineer. Even if optomechanical design difficulties can be overcome, the S-curve can be skewed at large focus offsets due to excessive spherical aberrations.

FIG. 1 is a schematic view illustrating an optical characterization system 100. The characterization system 100 may be configured as an inspection system or a metrology system. For example, the characterization system 100 may be an optical-based inspection system, a review system, or an image-based metrology system. The characterization system 100 may be, but is not limited to, an inspection system or a metrology system configured to inspect or measure a sample 140. The characterization system 100 may include a controller 150 (e.g., one or more computers) having a processor 152 and a memory 154. The controller 150 may receive measurement data from detectors 128*a* and 128*b* to characterize (e.g., inspect or measure) a structure on or in sample 140.

The controller 150 may include one or more processors 152 configured to execute program instructions maintained on a memory medium 154. In this regard, the one or more processors 152 of the controller 150 may execute any of the various process steps described throughout the present disclosure. Further, the controller 150 may be configured to receive data including, but not limited to, imagery data associated with the sample 140 from the detectors 128a-b.

The one or more processors 152 of the controller 150 may include any processor or processing element known in the art. For the purposes of the present disclosure, the term "processor" or "processing element" may be broadly defined to encompass any device having one or more processing or logic elements (e.g., one or more micro-processor devices, one or more application specific integrated circuit (ASIC) devices, one or more field programmable gate arrays (FPGAs), or one or more digital signal processors (DSPs)). In this sense, the one or more processors 152 may include any device configured to execute algorithms and/or instructions (e.g., program instructions stored in memory). In one embodiment, the one or more processors 152 may be embodied as a desktop computer, mainframe computer system, workstation, image computer, parallel processor, networked computer, or any other computer system configured to execute a program configured to operate or operate in conjunction with the metrology system 100, as described throughout the present disclosure.

Moreover, different subsystems of the system 100 may include a processor or logic elements suitable for carrying out at least a portion of the steps described in the present disclosure. Therefore, the above description should not be interpreted as a limitation on the embodiments of the present disclosure but merely as an illustration. Further, the steps described throughout the present disclosure may be carried out by a single controller 150 or, alternatively, multiple controllers 150. Additionally, the controller 150 may include one or more controllers housed in a common housing or within multiple housings. In this way, any controller 150 or combination of controllers 150 may be separately packaged as a module suitable for integration into the system 100. Further, the controller 150 may analyze data received from the detectors 128a-b and feed the data to additional components within the system 100 or external to the system 100.

The memory medium 154 may include any storage medium known in the art suitable for storing program instructions executable by the associated one or more processors. For example, the memory medium 154 may include a non-transitory memory medium. By way of another example, the memory medium 154 may include, but is not limited to, a read-only memory, a random-access memory (RAM), a magnetic or optical memory device (e.g., disk), a magnetic tape, a solid-state drive and the like. It is further noted that the memory medium 154 may be housed in a common controller housing with the one or more processors. In one embodiment, the memory medium 154 may be located remotely with respect to the physical location of the one or more processors 152 and the controller 150. For instance, the one or more processors 152 of the controller 150 may access a remote memory (e.g., server), accessible through a network (e.g., internet, intranet and the like).

In another embodiment, the controller 150 is communicatively coupled to one or more elements of the system 100 (e.g., a moveable focusing lens or the stage of the sample 140). In this regard, the controller 150 may transmit and/or receive data from any component of the system 100. Further, the controller 150 may direct or otherwise control any component of the metrology system 100 by generating one or more drive signals for the associated components. For example, the controller 150 may be communicatively coupled to the detectors 128a-b to receive one or more images from the detectors 128a-b.

The sample 140 may include any sample known in the art such as, but not limited to, a semiconductor wafer, a reticle, a photomask, and the like. In one embodiment, the sample 140 may be disposed on a stage assembly to facilitate movement of the sample 140. The stage assembly may include any stage assembly known in the art including, but not limited to, an X-Y stage, an R-θ stage, and the like. In another embodiment, the stage assembly is configured to adjust the height of the sample 140 during inspection to maintain focus on the sample 140. In yet another embodiment, the characterization system 100 may be moved up and down during inspection to maintain focus on the sample 140.

The characterization system 100 may include an illumination source 112 configured to generate an illumination beam. The illumination source 112 may include any illumination source known in the art suitable for generating an illumination beam (e.g., a light-emitting diode (LED)). For example, the illumination source 112 may emit near infrared (NIR) radiation, visible radiation, ultraviolet (UV) radiation, near UV (NUV), deep UV (DUV) radiation, vacuum UV (VUV) radiation, etc. The illumination source 112 may include one or more lasers (e.g., laser diodes (LDs)). In another instance, the illumination source 112 may include a broadband illumination source.

The characterization system 100 may include an illumination path configured to direct illumination from the illumination source 112 to the sample 140. The illumination path may include any number and type of optical components known in the art. In one embodiment, the illumination path includes one or more optical elements. It is noted herein that the one or more optical elements may include any optical element known in the art including, but not limited to, one or more lenses (e.g., lenses 120a-b, lenses 124a-c, and lens 134), one or mirrors (e.g., mirrors 130a-b), one or more polarizers, one or more prisms, one or more beam splitters (e.g., beam splitters 136a-b), one or more slit devices (e.g., slit device 117a), etc. The one or more optical elements may be located at any location within the illumination path, including, but not limited to, field planes or pupil planes (e.g., pupil 113).

The characterization system 100 may include a collection path configured to collect illumination reflected, scattered, diffracted, and/or emitted from the sample 140. In another embodiment, the collection arm path may direct and/or focus the illumination from the sample 140 to detectors 128a-b. It is noted herein that the detectors 128a-b may include any sensor and/or detector assembly known in the art. The detectors 128a-b may include, but are not limited to, a camera, a charge-coupled device (CCD detector), a complementary metal oxide semiconductor (CMOS) detector, a time-delay integration (TDI) detector, a photomultiplier tube (PMT), an avalanche photodiode (APD), a line sensor, an electron-bombarded line sensor, or the like. The collection path may include one or more optical elements. It is noted herein that the one or more optical elements may include any optical element known in the art including, but not limited to, one or more lenses (e.g., lenses 124a-c and lens 134), one or mirrors (e.g., mirror 130b), one or more polarizers, one or more prisms, one or more beam splitters (e.g., beam splitters 136a-b), one or more pupils, one or more slit devices (e.g., slit devices 117b-c), etc.

The detectors 128a-b may be communicatively coupled to one or more processors 152 of the controller 150. The one or more processors 152 may be communicatively coupled to a memory 154. The one or more processors 152 are configured to execute a set of program instructions stored in memory for acquiring measurement data from the one or more detectors 128a-b and/or controlling one or more portions of the characterization system 100.

The characterization system 100 may illuminate a line on sample 140 and may collect scattered and/or reflected illumination in one or more dark-field and/or bright-field collection channels. In this embodiment, detectors 128a-b may include a line sensor or an electron-bombarded line sensor.

The illumination source 112 may be a continuous source. For example, the illumination source 112 may include, but is not limited to, an arc lamp, a laser-pumped plasma light source, or a continuous wave (CW) laser. In another embodiment, the illumination source 112 is a pulsed source. For example, the illumination source 112 may include, but is not limited to, a mode-locked laser, a Q-switched laser, or a plasma light source pumped by a mode-locked or Q-switched laser. In another embodiment, the illumination source 112 may be a synchrotron-based illumination source. In another embodiment, the illumination source 112 may be an intensity-modulated source such as a current-modulated light-emitting diode (LED) or an illumination source placed before an optical chopper.

The slit devices 117a-c may comprise a single slit or an array of slits. The slit devices 117a-c may be placed in the illumination and collection paths of the system 100 at planes that are conjugate to the sample 140 (e.g., field planes). In this regard, the characterization system may operate as a confocal imaging system. The slit devices 117a-c may replace the projection and return masks used in conventional defect-detection systems. In one configuration, the collection path slit devices (e.g., slit devices 117b-c) may be tilted with respect to the optical axis, both in the direction of the slits and in a perpendicular direction (e.g., if Z is the optical axis, $R_x$ and $R_y$). The tilt of the devices 117a-c may introduce a continuous offset along the direction of the optical axis that varies across the plane of the slit devices 117a-c. Each point on this tilted plane may be conjugate to a normally oriented plane within a range of different focus offsets at the location of the sample 140. By adjusting the tilt angle of the plane of the return slit devices 117a-c, each slit may be optimized to cover a desirable focus offset range to meet application use cases (with potential overlap of these ranges determined by slit spacing). The combined focus offset range of all slits may be large, depending on the depth of focus at the plane and extent of tilt. The overlap of focus offset may be useful for data redundancy for noise suppression and averaging over several points across the sample 140 with potentially different reflectivity, and may help with determining the plane of focus of the sample 140.

Useful focus information may be derived from mapping the lateral (x, y) positions on the tilted plane to each position's corresponding axial focus offset. Coregistering the data from the various slits against this focus offset produces a curve representing through-focus data with no moving parts. According to standard confocal microscopy theory, light coming from out-of-focus planes may produce defocused and, therefore, blurred and enlarged images of the illumination slit device 117a. The collection slit devices 117b-c may reject most of this out-of-focus light such that signal is strongest from in-focus conjugate positions. The location of the peak of the through-focus curve (TFC) may indicate the surface location of the sample 140, which may then be compared against the BFP of the system 100 to determine their coincidence or offset. The peak location may be tracked with a closed loop control system and the stage of the sample 140 may be adjusted along the optical axis to maintain the peak at the desired Z location and enable automated focus tracking. The desired peak location may be either coincident with the nominal BFP of the system 100 or offset by a set amount for a specific application. If the peak is moved in one way or the other from the nominal position in the coregistered array, the direction and magnitude of the necessary movement needed to return the sample 140 to the desired focus plane is known. In conventional non-tilted confocal systems, only the peak can be tracked, and any deviation from the peak (e.g., after a discrete jump), cannot offer feedback on any corrective action.

The system 100 may have several configurable parameters: (1) tilt (depends on the desired amount of focus offset and the distribution across multiple slits, (2) slit width (light budget vs. resolution, e.g., ~1 Airy Unit width may be balanced), (3) slit spacing (field coverage and more data vs crosstalk from buried surfaces), (4) illumination pupil (light budget vs resolution), (5) camera parameters (binning resolution vs data handling), and (6) the algorithm for curve tracking (sensitivity of automated focus tracking).

Figure 2A:
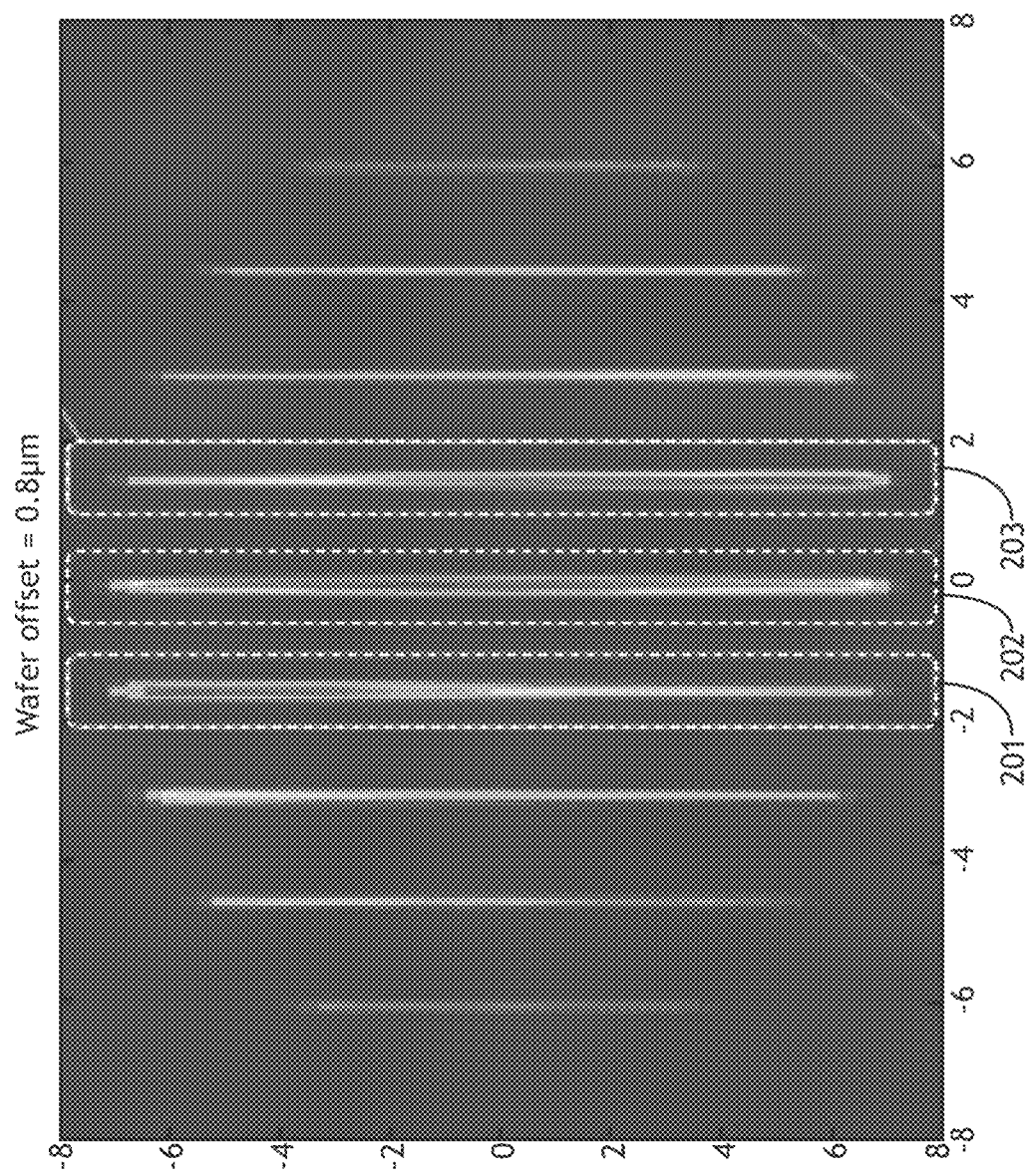
FIG. 2A shows a 2-D image of a slit device captured by a camera, in accordance with one or more embodiments of the present disclosure.
Figure 2B:
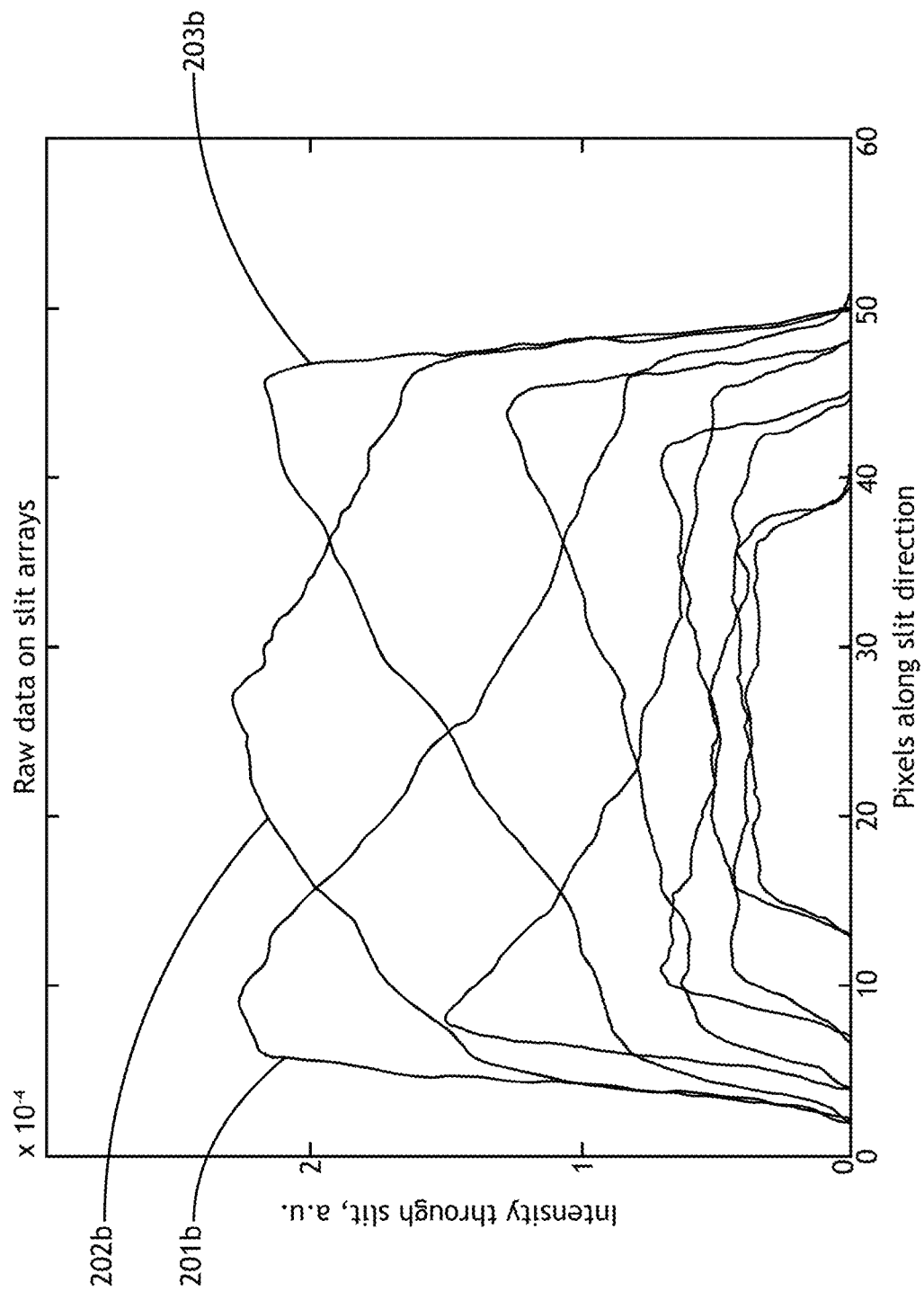
FIG. 2B is a graph showing binned confocal data for each slit shown in the image of FIG. 2A, in accordance with one or more embodiments of the present disclosure.

FIGS. 2A-2B and 3A-3B illustrate the processing of multi-slit data from one or more cameras (e.g., detectors 128a-b). FIG. 2A shows a 2-D image of a slit device (e.g., slit devices 117a-c) captured by a camera. FIG. 2B is a graph showing binned confocal data for each slit shown in the 2-D image. The slit 201 in FIG. 2A corresponds to the line 201b in FIG. 2B, the slit 202 in FIG. 2A corresponds to the line 202b in FIG. 2B, and the slit 203 in FIG. 2A corresponds to the line 203b in FIG. 2B.

Figure 3A:
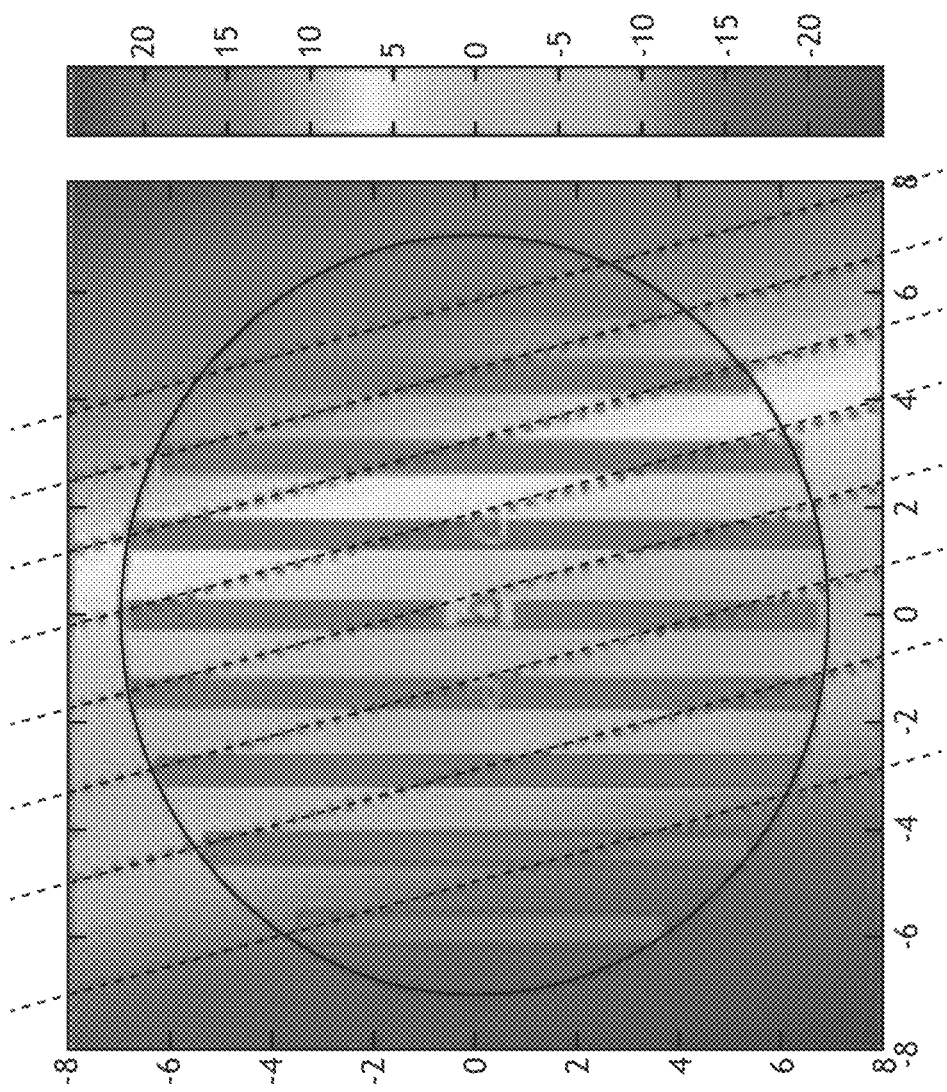
FIGS. 3A-3B illustrate depth of focus (DOF) coregistration by mapping the focus offset to position in the plane, in accordance with one or more embodiments of the present disclosure.
Figure 3B:
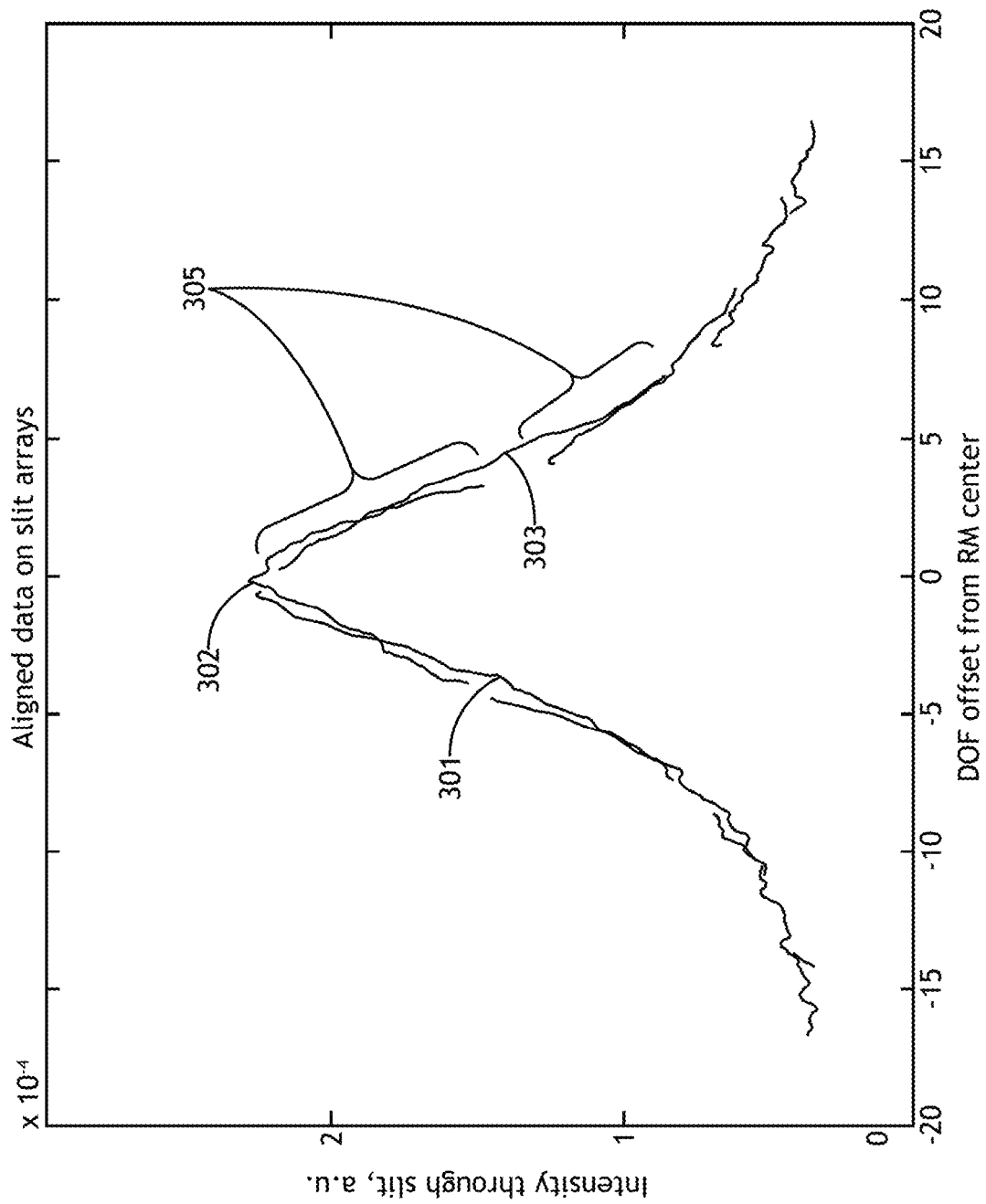

FIGS. 3A-3B illustrate depth of focus (DOF) coregistration by mapping the focus offset to position in the plane (ending with a final through-focus curve from one snapshot). The diagonal lines across the camera image in FIG. 3A are lines of equal focus offset. Data from three slits (a, b, c) shown in FIG. 3A correspond to lines 301, 302 and 303 shown in FIG. 3B, respectively. Each camera pixel (i, j) may be mapped to a depth of focus offset. The data may be truncated for the variation of slit height across the mask (e.g., slit devices 117a-c). As indicated by brackets 305, data from different slits may overlap.

The tilted collection slits may be achieved by placing physical slits in front of a 1-D array with relatively large-sized pixels, or by performing selective binning on a 2-D camera array with relatively small-sized pixels (binning over the number of pixels across the equivalent width of the slit). Binning in the camera (e.g., detectors 128a-b) may decrease data processing speeds compared to binning a full field image.

Figure 4A:
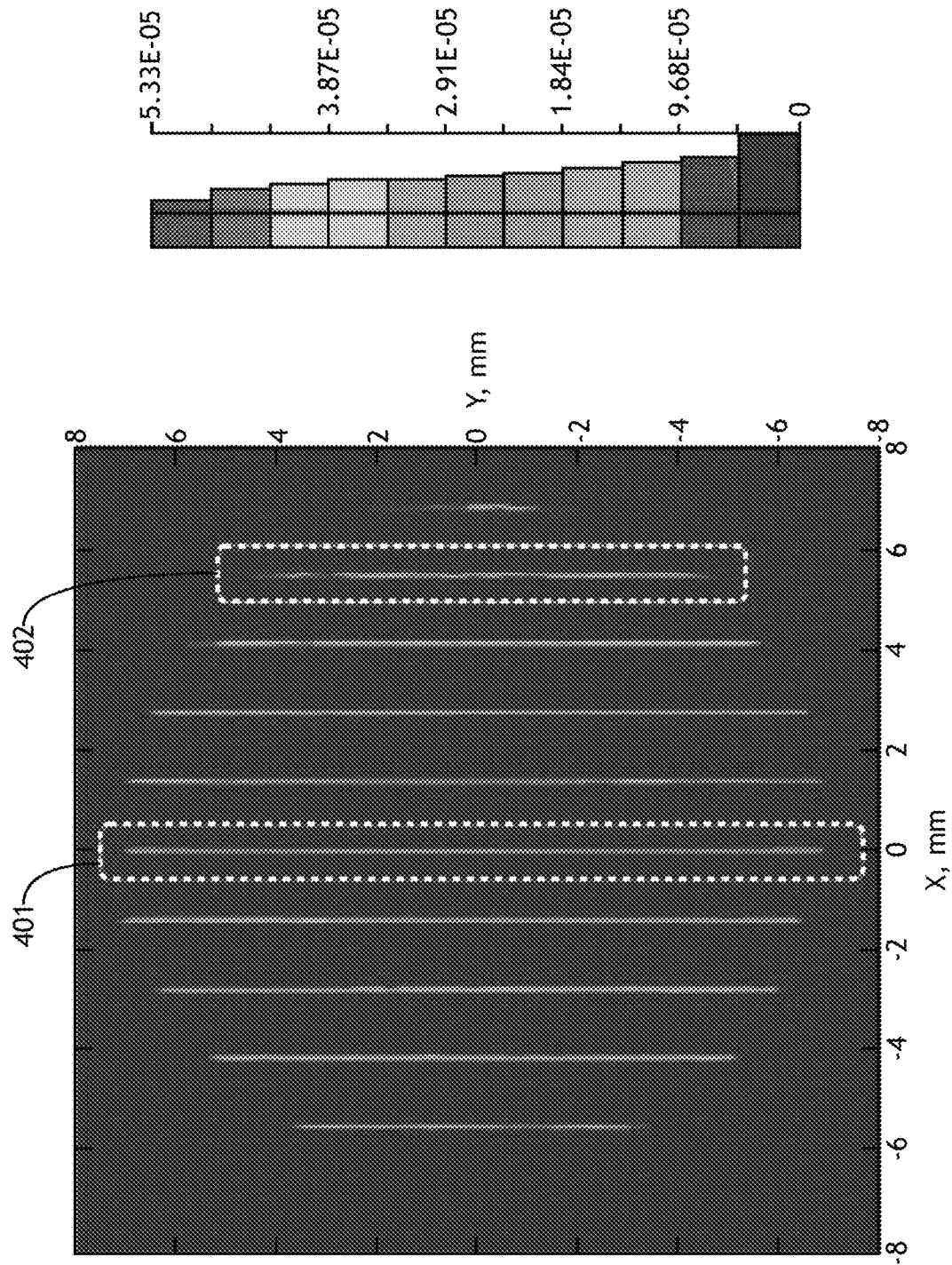
FIGS. 4A-4B illustrate using the columns of a camera image as slits, in accordance with one or more embodiments of the present disclosure.
Figure 4B:
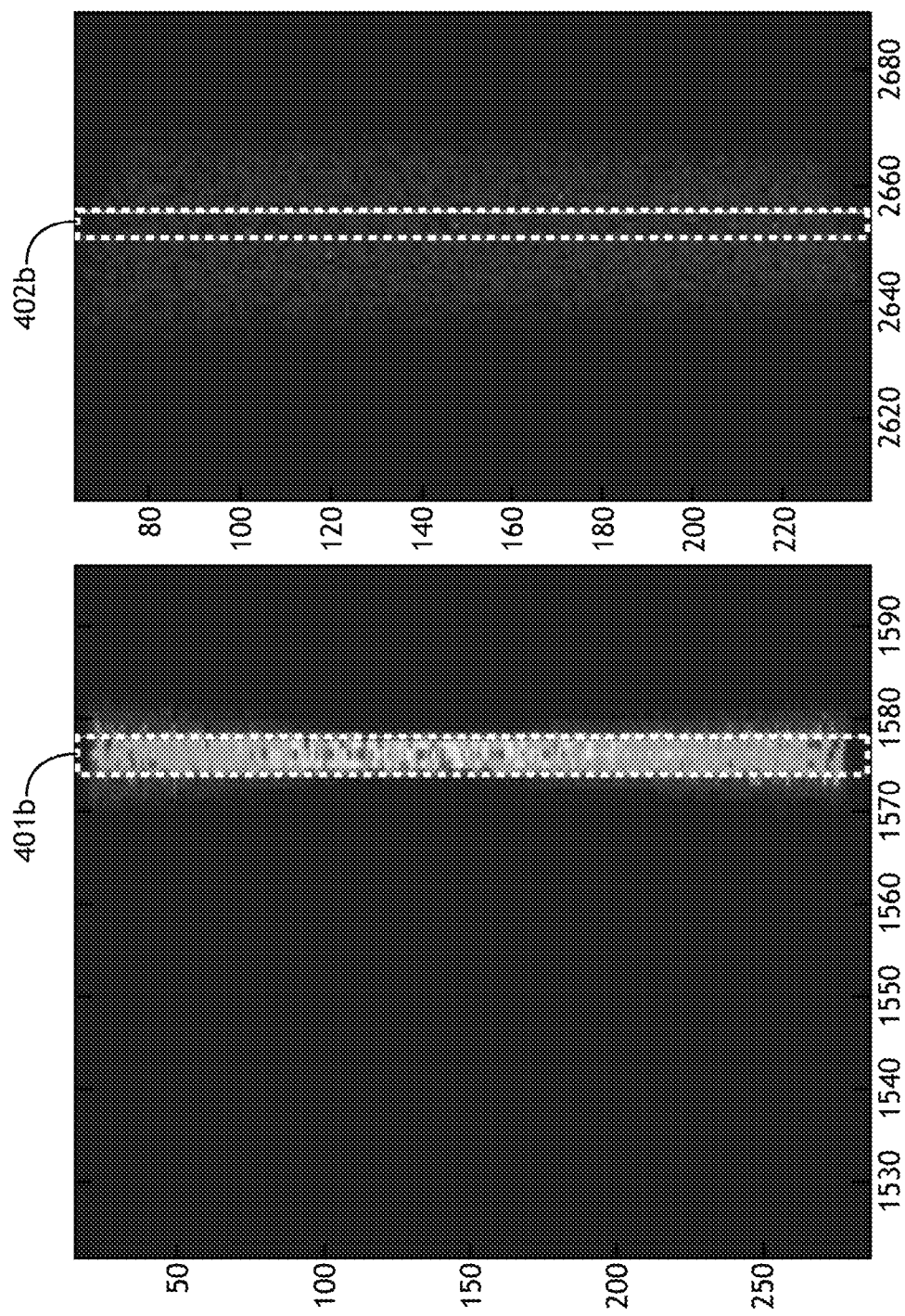

FIGS. 4A-4B illustrate using columns of pixels (or rows of pixels) of a camera image as slits. In this embodiment, the second slit device 117b may not be required. The slits 401 and 402 shown in FIG. 4A respectively correspond to the columns of pixels 401b and 402b (each having a width that may be multiple pixels across) shown in FIG. 4B. The camera images may have a digital confocal slit applied by binning over the number of pixels (e.g., four pixels) that combine to a desired width.

If it is desirable to position the sample 140 (e.g., wafer) at a known focus offset to probe different depths, the peak of the signal curve may be tracked to a different position along the mapped focus offset range (rather than centered). This tracking may be used with a movable focus lens to enable more extreme focus offsets. Moving this lens shifts the image of projection slits to an offset conjugate plane in the sample space. If the sample 140 is unmoved, the best focus location may move in the slit array (e.g., one or more slit devices 117a-c). Moving the sample 140 may translate the through-focus curve on the slit array. By combining the tilted slits with a movable focusing lens, the total reachable focus offset range is the sum of the ranges reached with either feature alone.

Figure 5A:
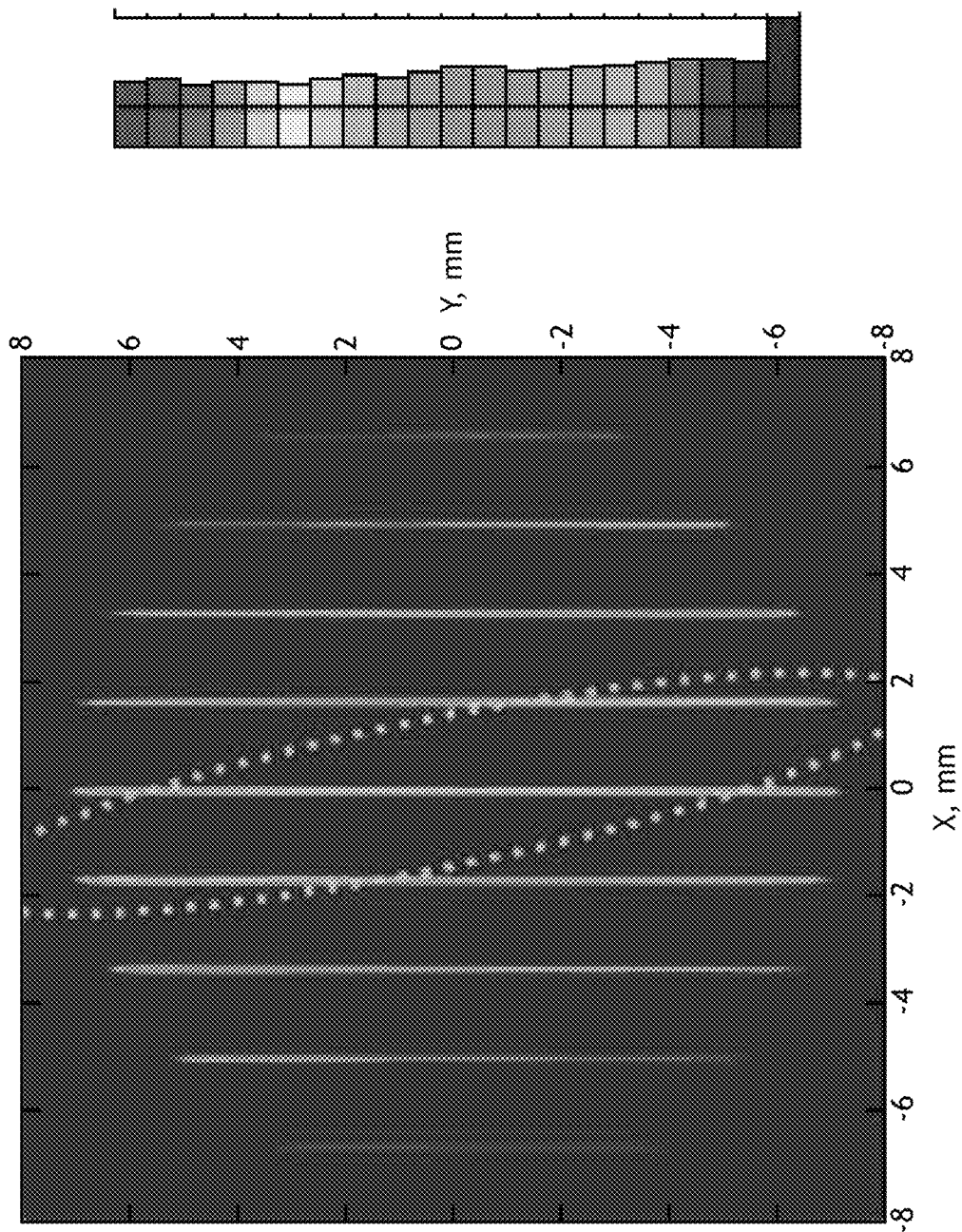
FIGS. 5A-B illustrate the response movement of the focusing lens at return slits, in accordance with one or more embodiments of the present disclosure.
Figure 5B:
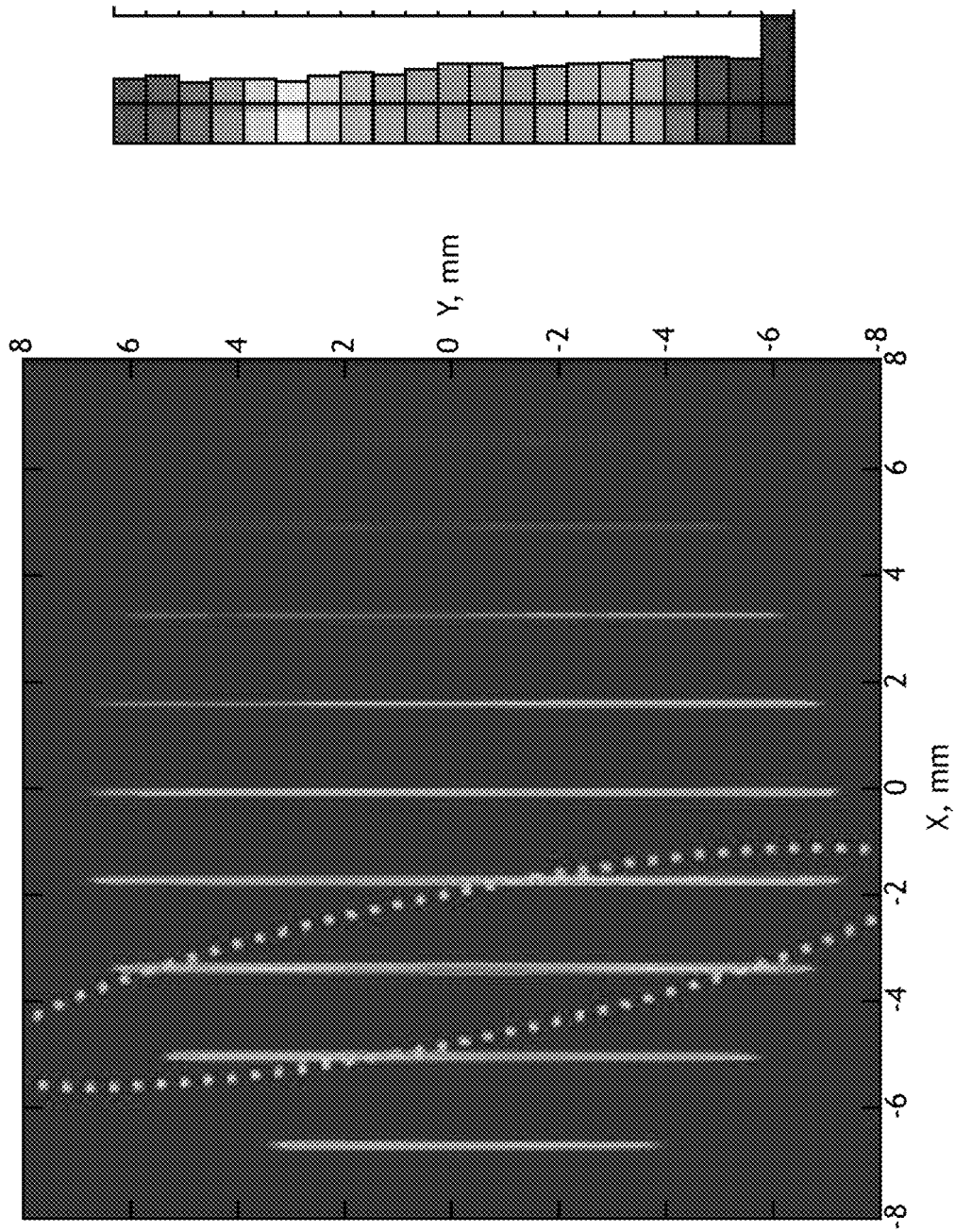

FIGS. 5A-B illustrate the response movement of the focusing lens at return slits (e.g., slit devices 117b-c). FIG. 5A shows the nominal focusing lens position at the wafer's nominal best focus. FIG. 5B shows the offset focusing lens position at the wafer's nominal best focus. The focusing lens movement shifts the center of the peak to a new location on the slit array.

In the event of variable reflectivity across the sample 140, compensation may be achieved by comparing the confocal data to the total energy reflected from an illuminated spot. For a 2-D camera, binning for confocal data may entail binning over the number of pixels to sum to the width of the desired slit, while binning for total energy entails potentially combining data from up to the full slit spacing. Alternatively, a second beam splitter may be used with a normal channel (see, e.g. FIG. 17). A first collection plane may include a slit device (e.g., slit device 117b) and a detector (e.g., detector 128a) to collect confocal data and a second collection plane may include a relatively wide slit device (e.g., slit device 117c) and a detector (e.g., detector 128b) for assessing the total energy reflected from each point on the sample 140.

Figure 6A:
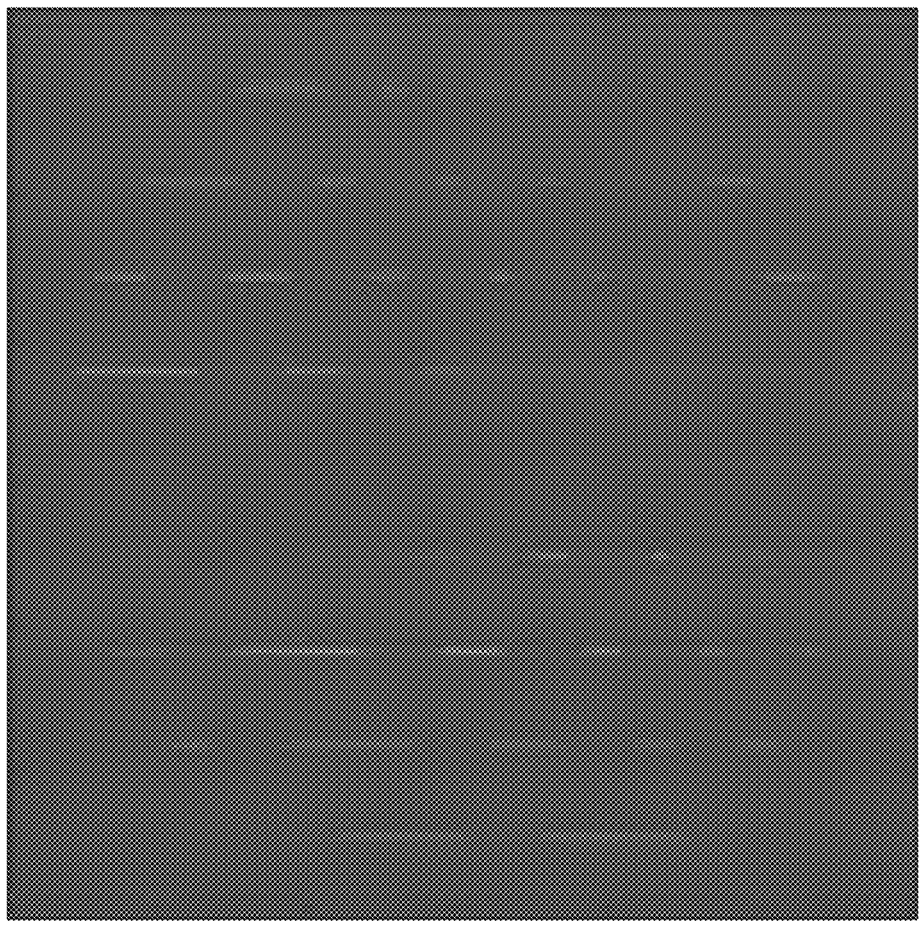
FIGS. 6A-C illustrate compensation for variable reflectivity across the field-of-view (FOV), in accordance with one or more embodiments of the present disclosure.
Figure 6B:
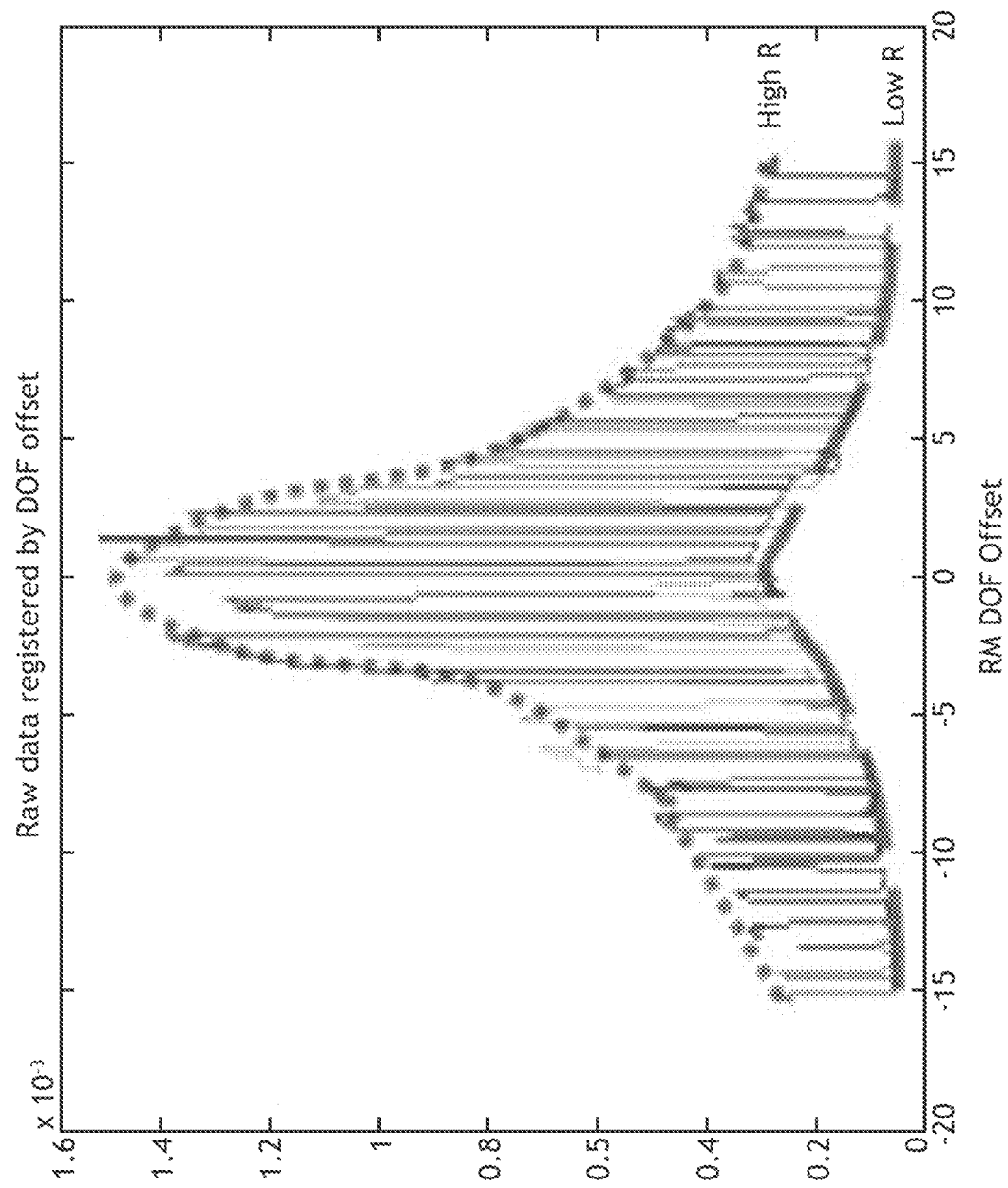
Figure 6C:
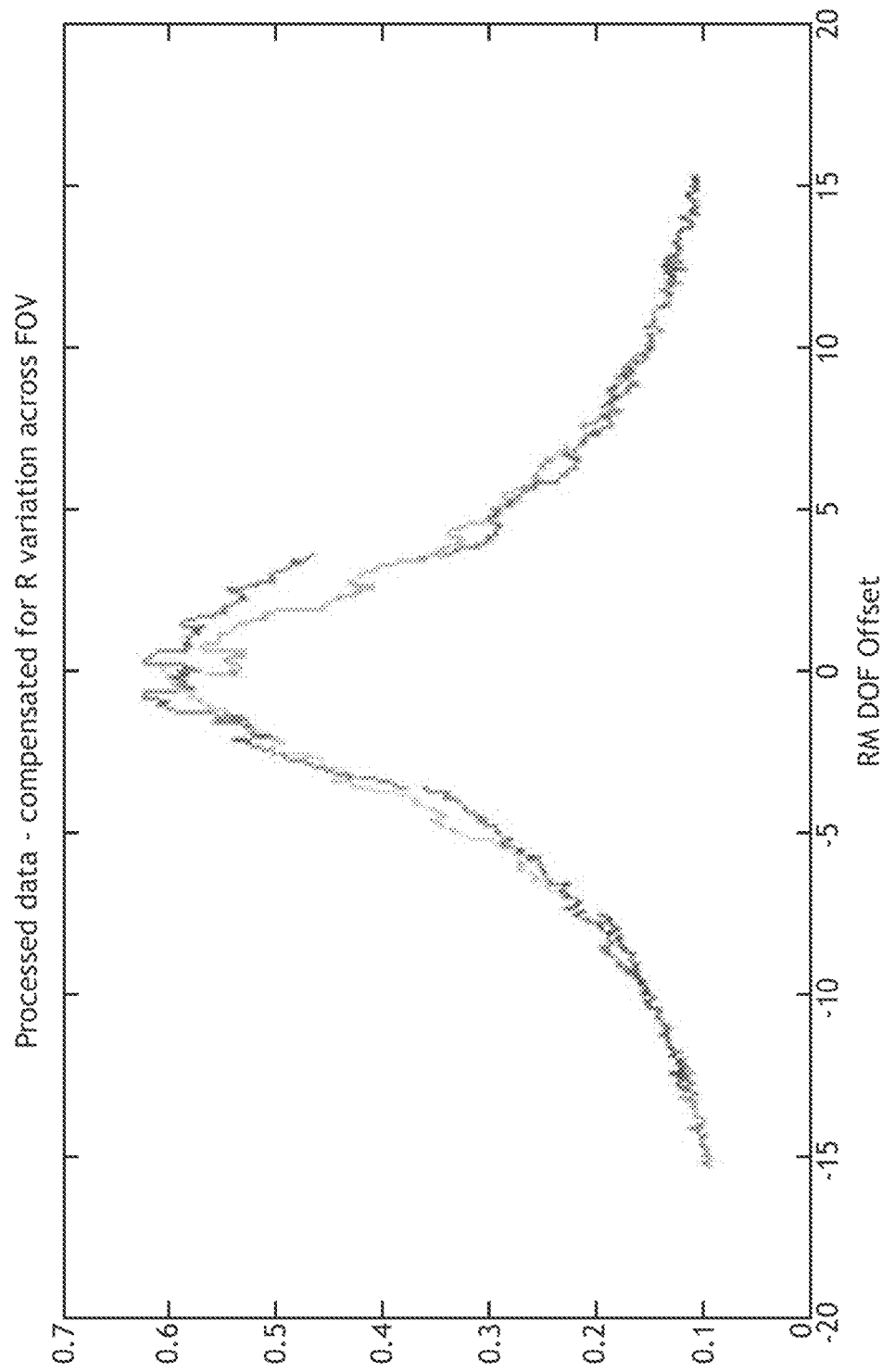

FIGS. 6A-C illustrate compensation for variable reflectivity across the field-of-view (FOV). Using two-step binning, confocal data and total reflectivity may be collected separately. By comparing the confocal data to the total energy from each location, the total through-focus curve (TFC) may be constructed. FIG. 6A is a 2-D image of data incident on a camera (simulated pattern with R=20% or 100%). FIG. 6B shows raw data registered by the DOF offset. FIG. 6C show the processed data compensated for reflectivity variation across the field of view. Binning over a narrow column set (e.g., three pixels wide) may act as an effective slit. Binning over a wide column set may act as a measure of reflectivity from illuminated regions of the sample 140.

The sensitivity of the automated focus system 100 may be associated with the ability to track the position of the through-focus curve, and not with the exact shape of the curve. The full-width at half-maximum (FWHM) of the curve may be used to describe the axial resolution of the confocal system. However, the tracking may be performed more sensitively depending on the algorithm. The peak may be identified by using high-ordered polynomial fitting to the coregistered data to find the offset with the maximum signal while also reducing data noise. From this maximum location, a region of a certain DOF range on either side of the maximum may be fit to a line. The intersection of the lines from either side may indicate the optimal depth of focus offset position, which may then be tracked as the data evolves through time (e.g., additional scans). It is noted that the depth of focus offset at the return slit location may be calculated based on a single pass, but reflective sample displacement may have an effective double-pass.

Figure 7:
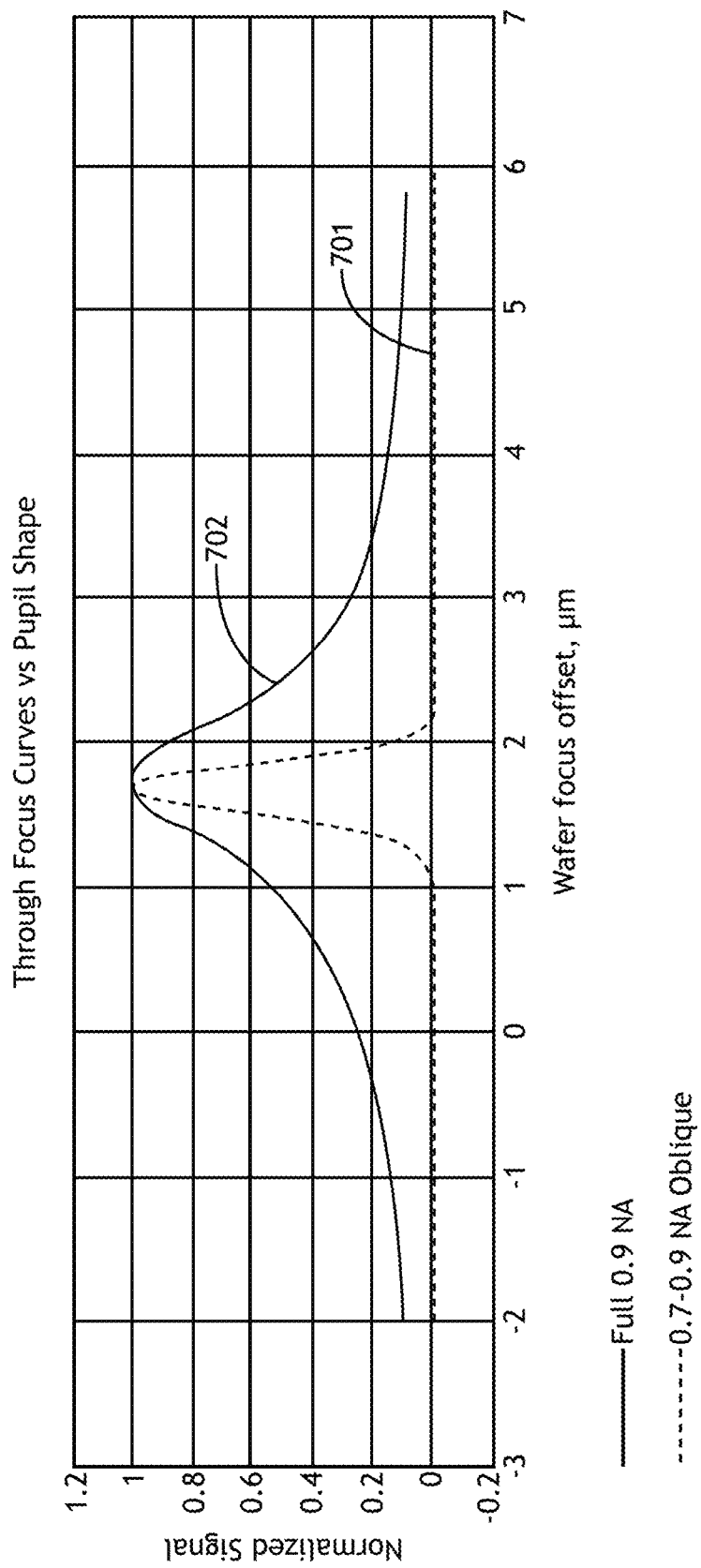
FIG. 7 is a graph showing improved axial resolution due to a high effective NA, in accordance with one or more embodiments of the present disclosure.

An improvement in axial resolution may prevent cross-talk from lower surfaces from having an impact on surface location tracking. Further improvement in axial resolution may be achieved by illuminating with a shaped pupil (e.g. by placing an aperture at the pupil 113). A smaller spot in high numerical aperture (NA) regions may provide angled illumination perpendicular to the slit length direction (not at the top or bottom of the slit). This smaller spot increases the effective NA of the system and prevents reflections from lower surfaces from being collected within the slit height. FIG. 7 is a graph showing improved axial resolution due to a high effective NA. The high effective NA reduces the FWHM of the TFC and provides enhanced resolution for the prevention of cross-talk. Line 701 is associated with a numerical aperture of 0.7 to 0.9 and line 702 is associated with a numerical aperture of 0.9.

It is noted herein that the confocal automated focus technique (e.g., described with respect to FIG. 1) may be combined with additional automated focus techniques. For example, the confocal automated focus technique may be combined with the process-of-record (POR) automated focus technique described previously to achieve results that are not possible with either technique alone. However, the present disclosure is not limited thereto, and may be combined with other automated focus techniques not explicitly described herein.

Figure 8A:
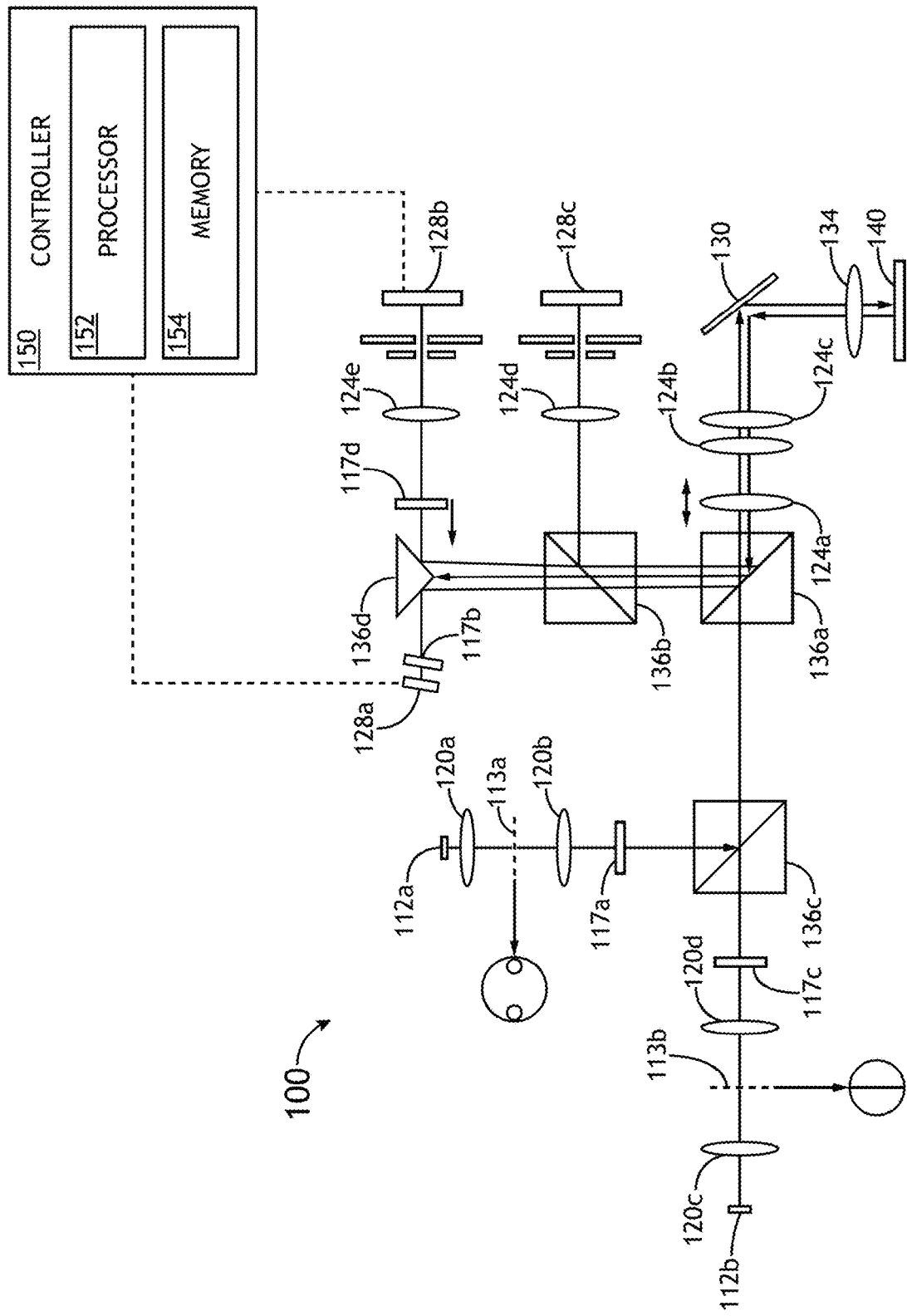
FIG. 8A is a schematic view of an optical characterization system, in accordance with one or more embodiments of the present disclosure.

FIG. 8A is a schematic view of an optical characterization system 100 including POR automated focus elements. Tilted confocal slit devices may be combined with the POR automated focus described previously to achieve performances and functionality that may not be possible with a stand-alone confocal system 100. The components described with respect to FIG. 8A may be substantially identical to the similarly named components described with respect to FIG. 1. The system 100 as shown in FIG. 8A may include illumination sources 112a-b, lenses 120a-d, pupils 113a-b, slit devices 117a-b, masks 117c-d, 117a-d, lenses 124a-e and 134, beam splitters 136a-c, a prism mirror 136d, a mirror 130, a sample 140, detectors 128a-c, and a controller 150. The confocal components may have an illumination path associated with the illumination source 112a, the lenses 120a-b, the pupil 113a, and the slit device 117a, and a collection path associated with the slit device 117b and the detector 128a. The POR automated focus components may have an illumination path associated with the illumination source 112b, the lenses 120c-d, the pupil 113b, and the projection mask 117c, and a collection path associated with the return mask 117d, the lenses 124e-d, and the detectors 128b-c.

It is noted herein that cross-talk may be introduced from several sources. One source of cross-talk may be related to the signal associated with the confocal components interfering with the signal associated with the POR components. Another source of cross-talk may be related to a signal being reflected from a first surface interfering with a signal being reflected from a second surface (for example, when measuring 3-D structures such as 3-D NAND wafers).

Figure 8B:
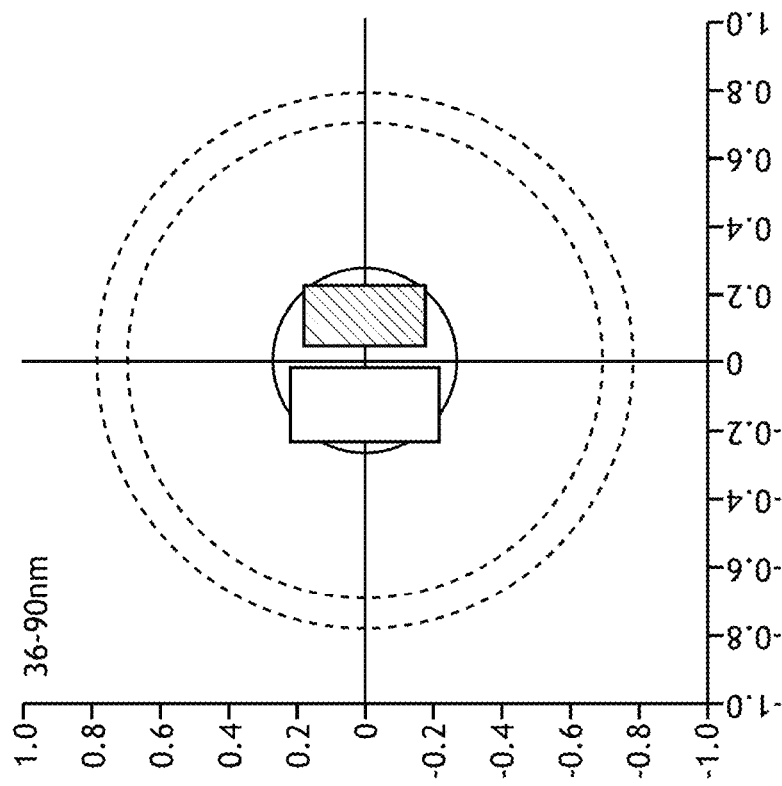
FIG. 8B illustrates the splitting of a field of view to prevent cross-talk, in accordance with one or more embodiments of the present disclosure.
Figure 8B:
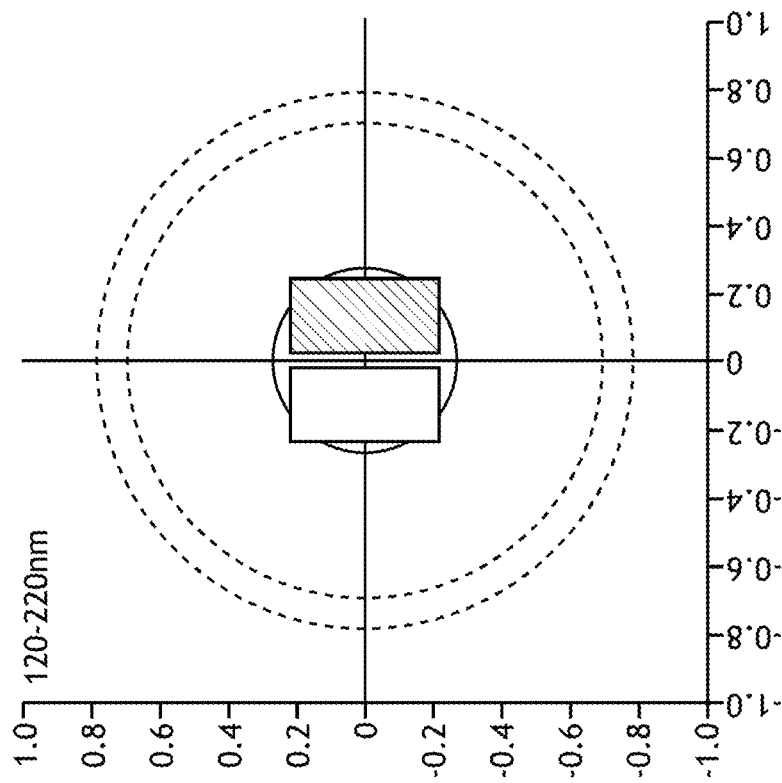

FIG. 8B illustrates the splitting of the field of view to prevent cross-talk between the signal associated with the confocal components and the signal associated with the POR components. Light passing through the illumination aperture may illuminate the slit array (e.g., slit device 117a) after passing through another set of relay lenses. The slit array may use half of the field of view. The POR AF components may use the other half of the field of view. This arrangement may prevent light cross-talk from the two optical paths. Confocal light passing through the common path is reflected into a tilted slit array (e.g., slit device 117b) with light detected by a 2-D camera (e.g., detector 128a). The prism mirror 136d is used to separate the confocal light from the POR AF light.

In the optical path of the confocal components, the illumination source 112a illuminates a physical aperture stop (e.g., located at pupil 113a) located at the back focal plane of a relay lens. If the aperture stop at the pupil 113a is a dipole, the pupil 113a may reduce the FWHM of the TFC. The aperture size and shape may be optimized for each case to achieve a desirable TFC shape and width.

FIG. 9A shows various shapes of an aperture that may be placed in the illumination pupil 113a to provide different angular distributions of light on the sample 140. The placement of the aperture in the illumination path may reduce the side lobes of the TFC and thus may reduce cross-talk between a signal associated with one layer of the sample 140 and a signal associated with another layer of the sample 140. The aperture may be a full open aperture, a half open aperture, a ring aperture, or a center blocked aperture. In some embodiments, the aperture may be a dipole aperture (e.g., two circular apertures placed at opposite ends of a stop) or a slit aperture. As shown in FIG. 9B, the aperture may have a soft transition (i.e., apodization) instead of a knife edge to further reduce the side lobes of the through-focus curve. It is noted herein that the shapes of the apertures are not limited to the shapes shown in FIGS. 9A and 9B, and that aperture may have any shape that reduces the probability of cross-talk. For example, the shape of the aperture may be customized for the particular patterns of the sample 140.

The optical path of the POR AF components may be similar to a conventional AF method. The differences may lie in the illumination aperture (e.g., at the pupil 113b), the collection apertures (e.g., with a stop in front of each of the detectors 128b-c), the grid mask pitch, and the splitting ratio of the beam splitter 136c (optimized to achieve a long linear range in the S-curve without increasing detection noise). A 0.5 NA aperture may be used for illumination and a 0.5 NA stop may be used for collection. This configuration may extend the S-curve linear range by two times. By increasing the grid mask pitch, the S-curve linear range may be further increased proportionally (thus eliminating the loss-of-focus issue of the conventional AF method). In this embodiment, the POR AF components may act as the primary autofocus tracker during wafer inspection. The confocal components may act as a focus error detection channel when the POR AF channel deviates from tracking the wafer surface (e.g., due to process variation). The confocal components may detect the deviation amount and direction of the POR channel from the intended focus tracking surface.

Figure 10:
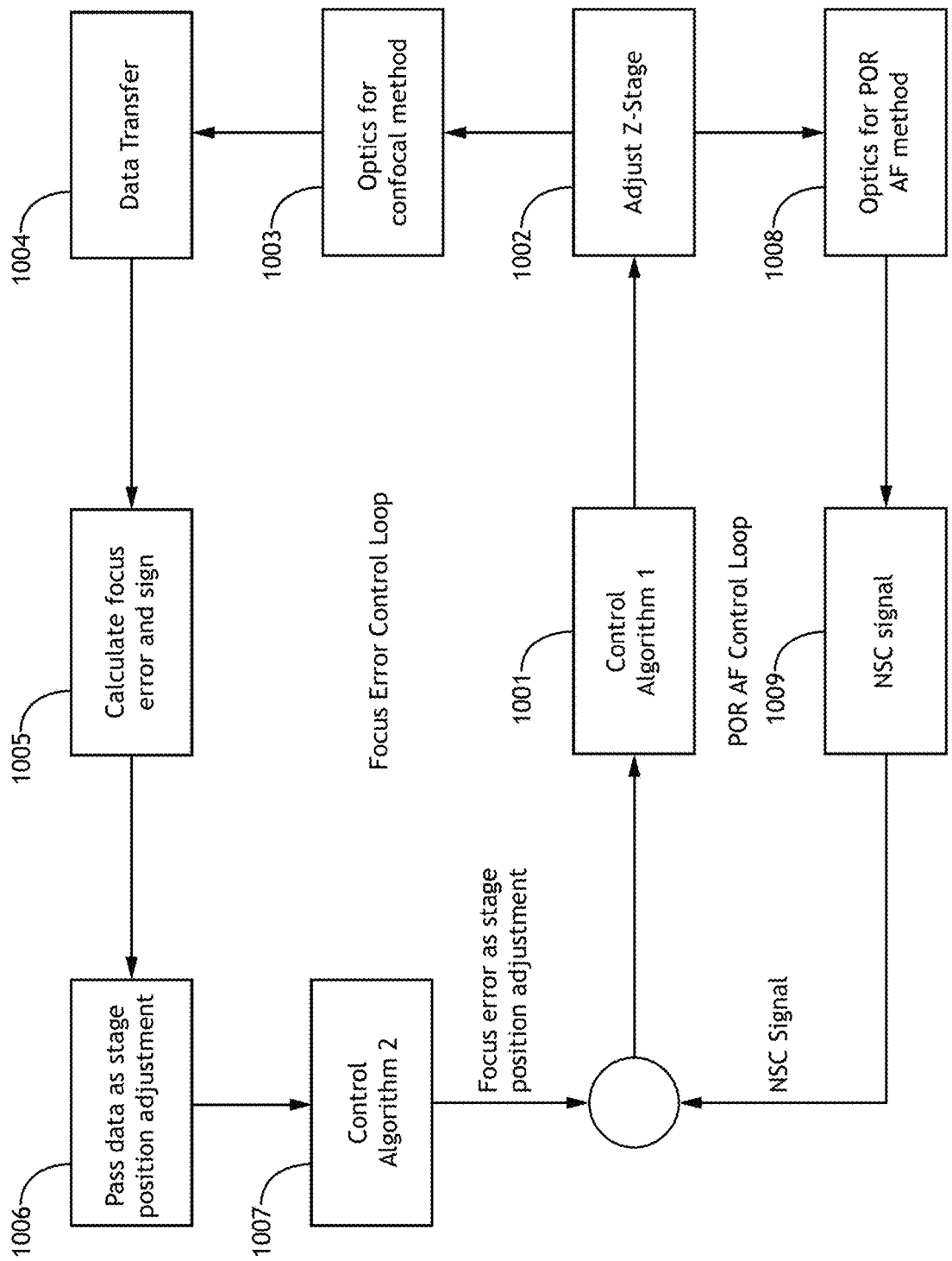
FIG. 10 is a control loop illustrating the combination of confocal components and process-of-record (POR) components for automated focus tracking, in accordance with one or more embodiments of the present disclosure.

FIG. 10 shows control loops associated with both confocal components and POR components. In a first control loop (e.g., the control loop associated with POR components), a controller may receive an a control signal 1009 (e.g., an NSC signal or a stage position adjustment value) from the POR AF components 1008 and, using a control algorithm 1001, an adjustment signal 1002 may adjust the height of the stage holding the sample in a Z-direction to achieve a desired stage position (e.g., where NSC=0).

In a second control loop (e.g., the control loop associated with confocal components), a controller may receive data 1004 from confocal optics 1003 and one or more detectors, and may calculate the sign and magnitude of the focus error 1005 (e.g., by using the position of the center of the through-focus curve). The focus error 1005 may then be converted into a control signal 1006 (e.g., a stage position adjustment value). It is noted herein that the sign of the focus error may indicate the direction that the stage is adjusted. For example, a positive focus error may signal the stage to be lowered, and a negative focus error may signal the stage to be raised. In other embodiments, a positive sign may signal the stage to be lowered, and a negative sign may signal the stage to be raised.

The control signal 1006 may be transmitted to a second control algorithm 1007. The control signal 1006 may be combined with the control signal 1010 (e.g., both control signals may be averaged or one signal may be used as a back-up indicator of gross defocus) to produce the adjustment signal 1002 for focus correction (e.g., by adjusting the height of the stage holding the sample 140 to achieve a desired focus). The focus error 1005 detected by the second control loop may be recorded during wafer inspection. This focus error map may reflect how the focus detected by the POR AF varies according to process variation (i.e., the focus error map itself provides valuable information for wafer manufacturing process variation monitoring).

Figure 11:
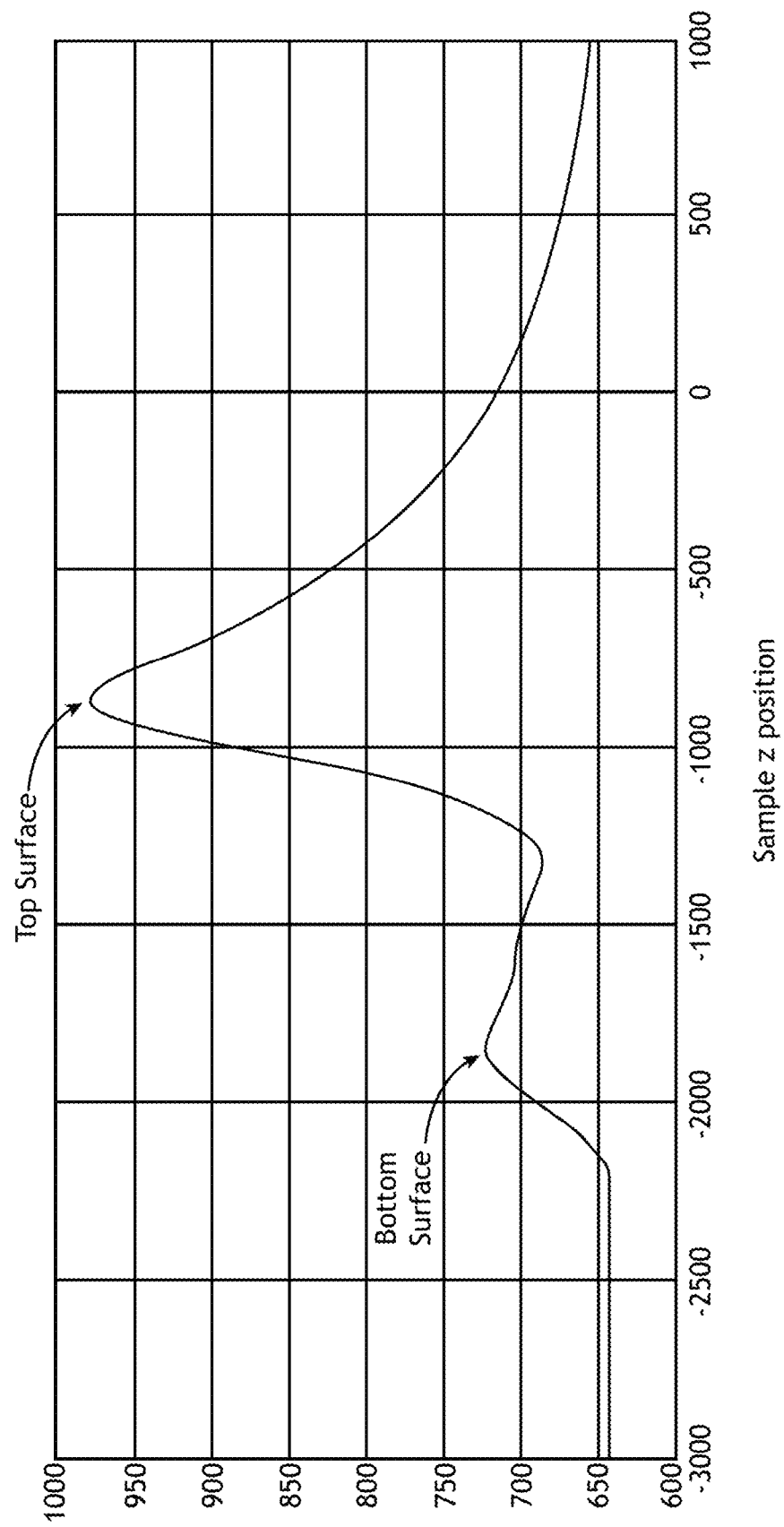
FIG. 11 is a through-focus curve (TFC) of a sample with two reflective surfaces seen within a covered focus offset range, in accordance with one or more embodiments of the present disclosure.

FIG. 11 is a TFC of a sample with two reflective surfaces seen within a covered focus offset range. In layered samples (e.g., 3-D NAND semiconductor wafers), a signal may be reflected from more than one surface. These reflections may result in a TFC that has more than one peak. When multiple peaks are present, cross-talk may interfere with the interpretation of results. In severe cases, one peak may render a second peak unnoticeable. In less severe cases, overlapped peaks may still affect the apparent location of the peaks if extreme caution when handling data is not taken.

Figure 12:
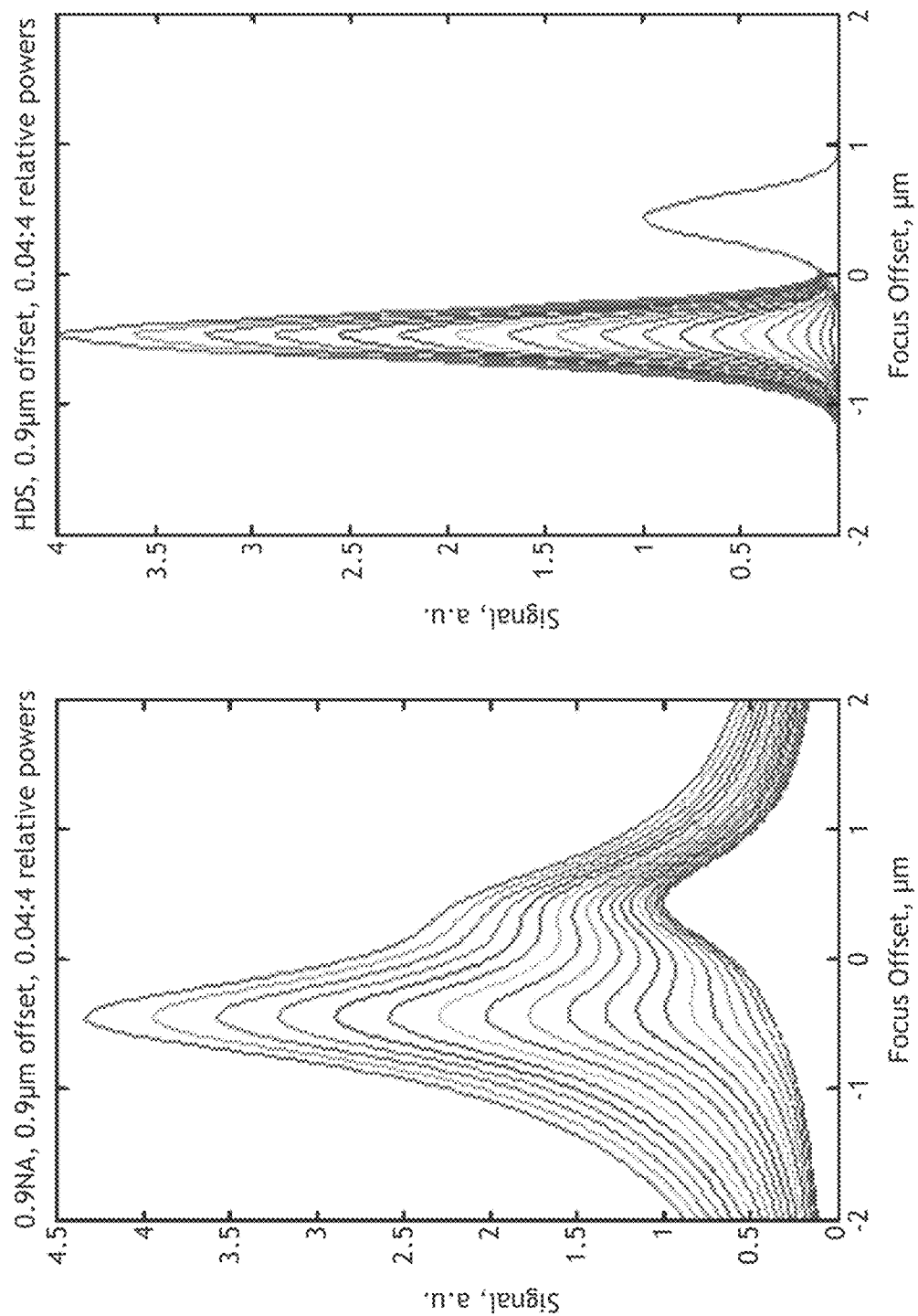
FIGS. 12 and 13 illustrate the effects of cross-talk for two different effective illumination pupils, in accordance with one or more embodiments of the present disclosure.
Figure 13:
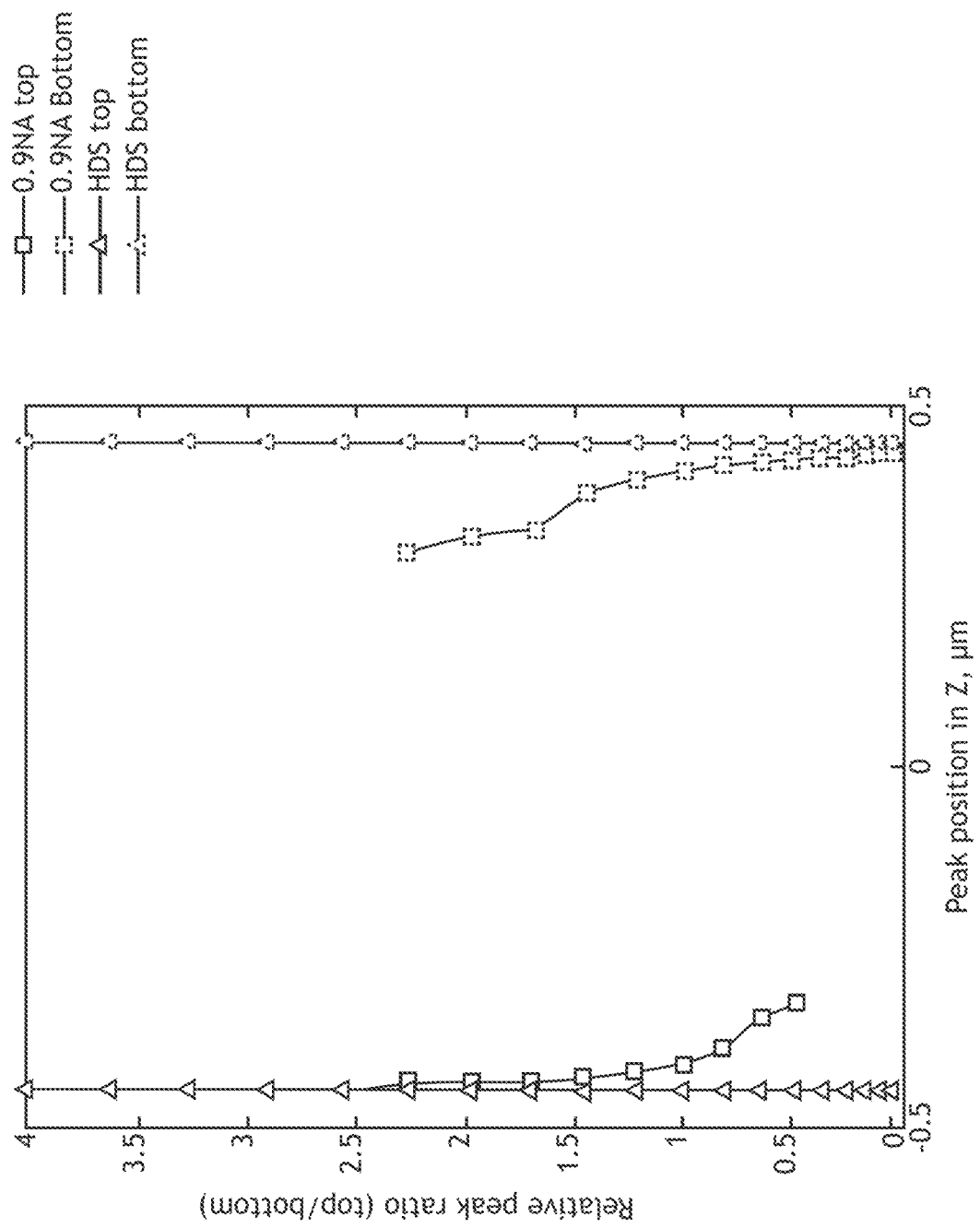

FIGS. 12 and 13 illustrate the effects of cross-talk for two different effective illumination pupils. The relatively broad NA case provides a wider TFC, shows more effects of cross-talk, and hides a weaker peak (or presents the weaker peak as shifted). The relatively high NA case provides an improved resolution (a narrower TFC) and as a result may tolerate more closely spaced peaks without being negatively impacted by cross-talk.

FIG. 13 shows the impact of cross-talk on peak location. A stronger peak may pull the apparent location of the weaker peak toward the stronger peak. In this example, equally weighted peaks may be pulled together. All weightings of the cross-talk heavy 0.9 NA show apparent peak separations impacted by the cross-talk, while the high effective NA or narrow TFC case sees no effect on the apparent separation of the peaks.

The confocal implementations described in the present disclosure offer several advantages. For one, axial resolution improvement enables the differentiation of the reflection of the signal from the top surface from reflections from lower surfaces. This differentiation enables the automated focus system to track to top surfaces rather than some unknown variable plane beneath. The conventional methods have issues tracking a consistent depth, and therefore defect detection sensitivity may be variable across the wafer, particularly in regions of process variation. Since confocal slit devices may offer increased axial resolution to identify upper and lower surfaces of a sample (e.g., a 3-D NAND wafer layer stack on top of a silicon substrate), it may also be possible to monitor for variations in the measured separation of the surfaces. Changes in this separation are due to differences in the optical path length (e.g., the bulk index of refraction or thickness, or both). Depending on the index, thickness and DOF range covered by the slits, two peaks may be tracked in a single configuration. Additionally, through-focus information may be available with no moving parts. Changes to the through-focus profile may also be indicative of other types of sample variation, with fine structures potentially modifying this curve in unique ways. Using a high NA section of pupil for confocal illumination may reduce FWHM of the confocal TFC, which may reduce cross-talk if there are multiple peaks from multiple surface reflections. The sensitivity of the position of the first peak to the cross-talk of the second peak may be reduced for wafers with process variation. Apodization of illumination aperture may further reduce cross-talk.

Figure 14:
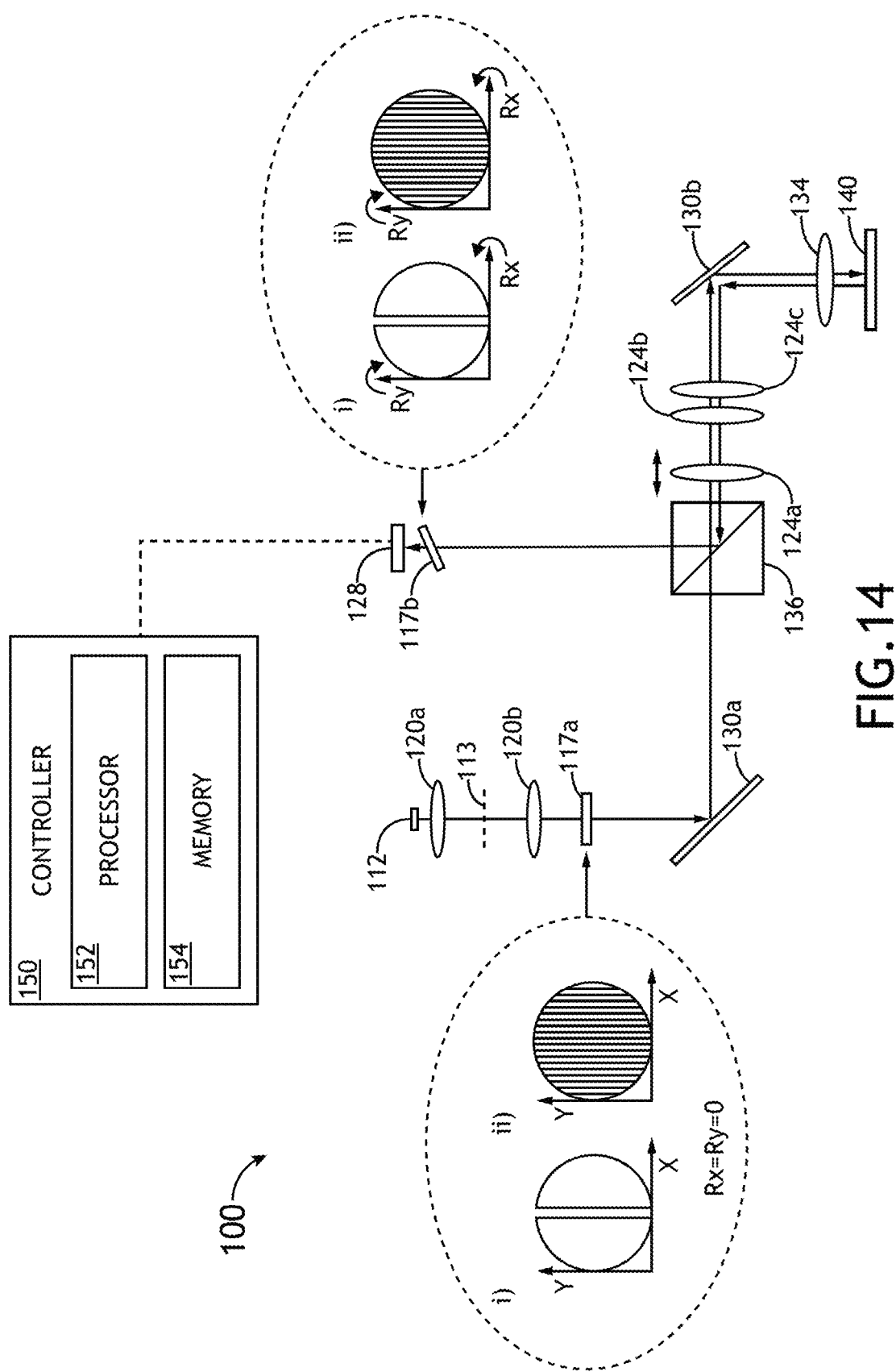
FIGS. 14-20 are schematic views illustrating various optical characterization systems, in accordance with one or more embodiments of the present disclosure.

FIG. 14 is a schematic view of an optical characterization system 100. The components described with respect to FIG. 14 may be substantially identical to the similarly named components described with respect to FIG. 1. The system 100 as shown in FIG. 14 may include an illumination source 112, lenses 120a-b, a pupil 113, slit devices 117a-b, lenses 124a-c and lens 134, a beam splitter 136, a mirror 130b, a sample 140, and a detector 128. In this embodiment, the slit device 117a in the illumination path may be perpendicular with respect to the optical axis and the slit device 117b in the collection path may be tilted with respect to the optical axis. Each of the slit devices 117a-b may comprise a single slit (i) or an array of slits (ii).

Figure 15:
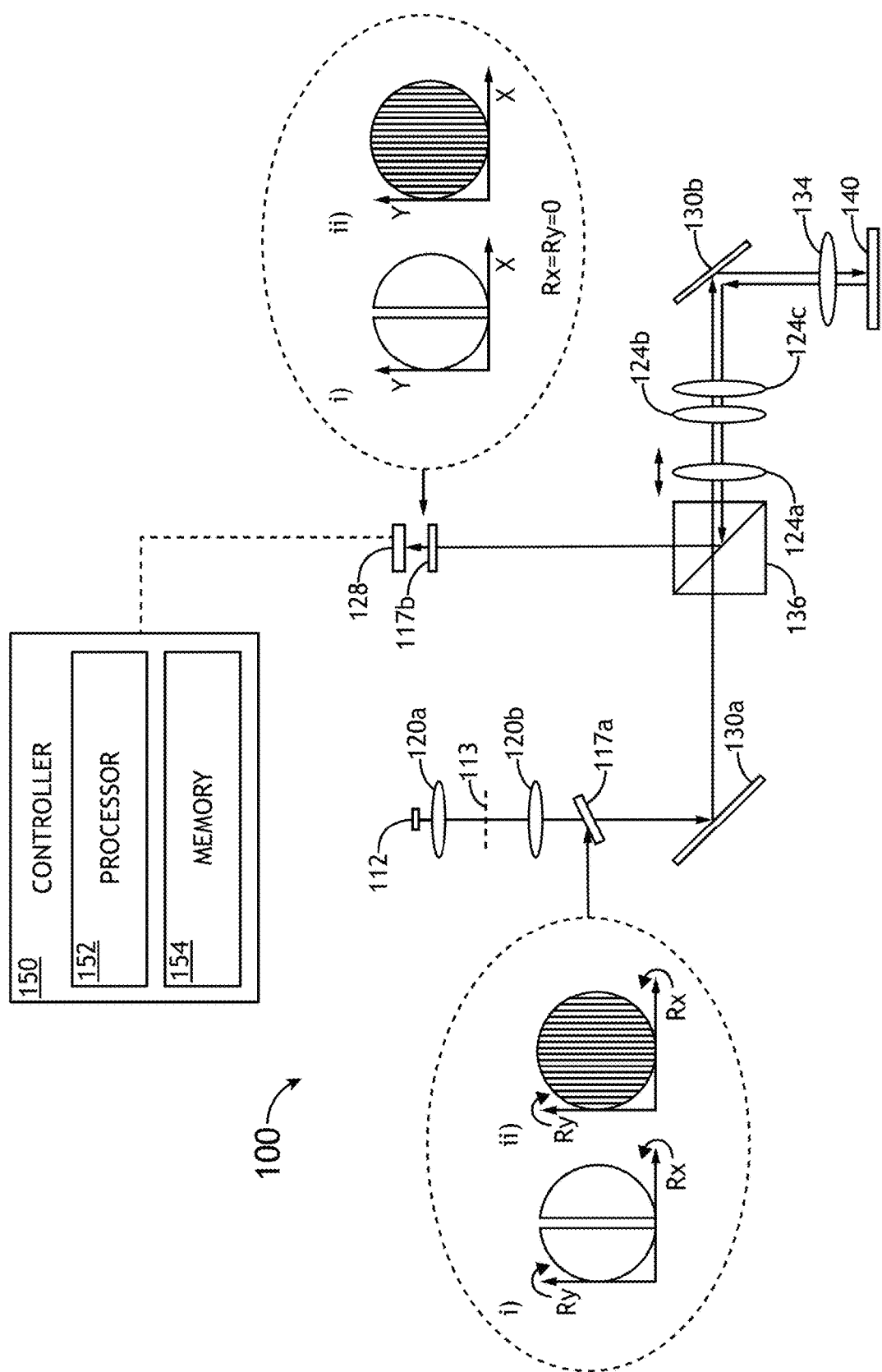

FIG. 15 is a schematic view of an optical characterization system 100. The components described with respect to FIG. 15 may be substantially identical to the similarly named components described with respect to FIG. 1. The system 100 as shown in FIG. 15 may include an illumination source 112, lenses 120a-b, a pupil 113, slit devices 117a-b, lenses 124a-c and lens 134, a beam splitter 136, a mirror 130b, a sample 140, and a detector 128. In this embodiment, the slit device 117a in the illumination path may be tilted with respect to the optical axis and the slit device 117b in the collection path may be perpendicular with respect to the optical axis. Each of the slit devices 117a-b may comprise a single slit (i) or an array of slits (ii).

Figure 16:
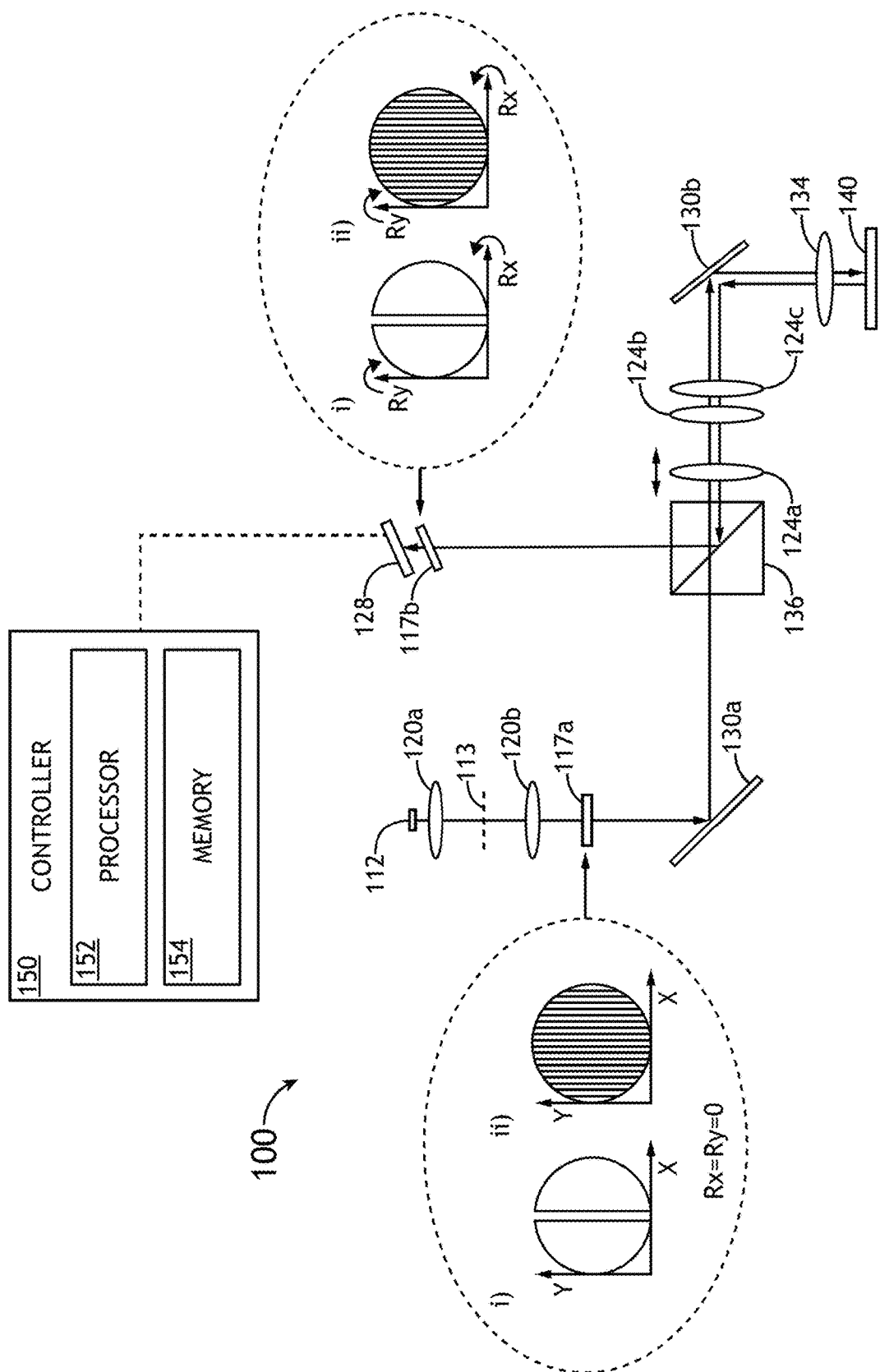

FIG. 16 is a schematic view of an optical characterization system 100. The components described with respect to FIG. 16 may be substantially identical to the similarly named components described with respect to FIG. 1. The system 100 as shown in FIG. 16 may include an illumination source 112, lenses 120a-b, a pupil 113, slit devices 117a-b, lenses 124a-c and lens 134, a beam splitter 136, a mirror 130b, a sample 140, and a detector 128. In this embodiment, the slit device 117a in the illumination path may be perpendicular with respect to the optical axis and the slit device 117b in the collection path may be tilted with respect to the optical axis. Each of the slit devices 117a-b may comprise a single slit (i) or an array of slits (ii). In this embodiment, the slit devices 117a-b may be matched to each other (e.g., either both single slits, or both slit arrays). The detector 128 may be a 1-D array or a binned detector. In some embodiments, the slit device 117b may be removed (e.g., the return slit device), and the detector 128 may be a 2-D camera with binning.

Figure 17:
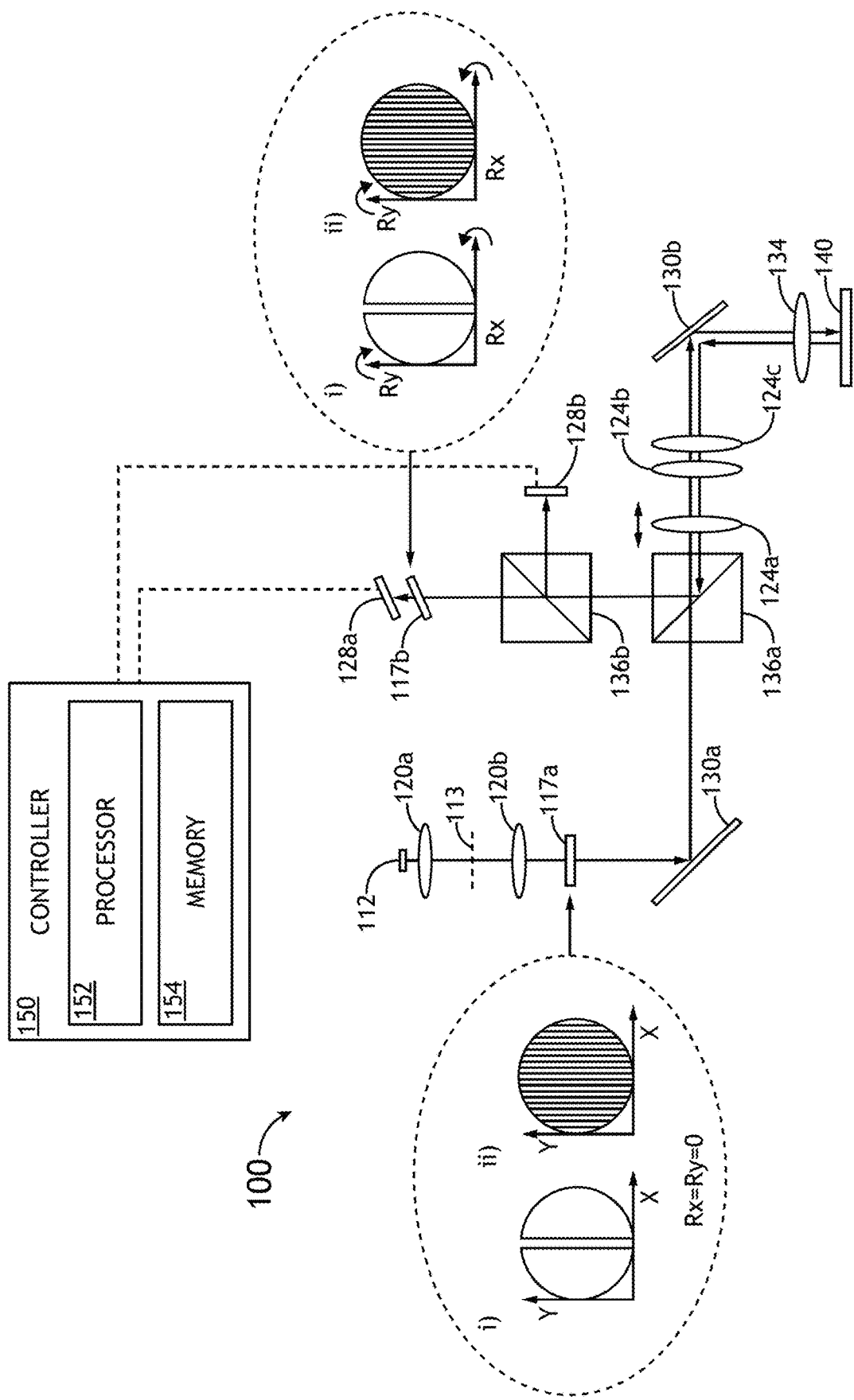

FIG. 17 is a schematic view of an optical characterization system 100. The components described with respect to FIG. 17 may be substantially identical to the similarly named components described with respect to FIG. 1. The system 100 as shown in FIG. 17 may include an illumination source 112, lenses 120a-b, a pupil 113, slit devices 117a-b, lenses 124a-c and lens 134, beam splitters 136a-b, a mirror 130b, a sample 140, and a detector 128a-b. In this embodiment, the slit device 117a in the illumination path may be perpendicular with respect to the optical axis and the slit device 117b in the collection path may be tilted with respect to the optical axis. Each of the slit devices 117a-b may comprise a single slit or an array of slits. In this embodiment, the beam splitter 136b splits the optical path between a first channel (comprising the slit device 117b and the detector 128a) and a second channel (comprising the detector 128b). The second channel may be configured to normalize a signal to compensate for wafer pattern reflectivity variations.

A movable focusing lens may introduce additional focus offset to increase the overall focus offset range (labelled lens 124a in FIG. 1, FIG. 8, and FIGS. 14-17). An adjustable tilt ($R_x/R_y$) of the slit devices 117a-b may tune overlap (data redundancy) vs DOF range as desired. The inclusion of adjustable slit widths through camera binning may be used to increase illumination and decrease resolution, or vice versa.

Figure 18:
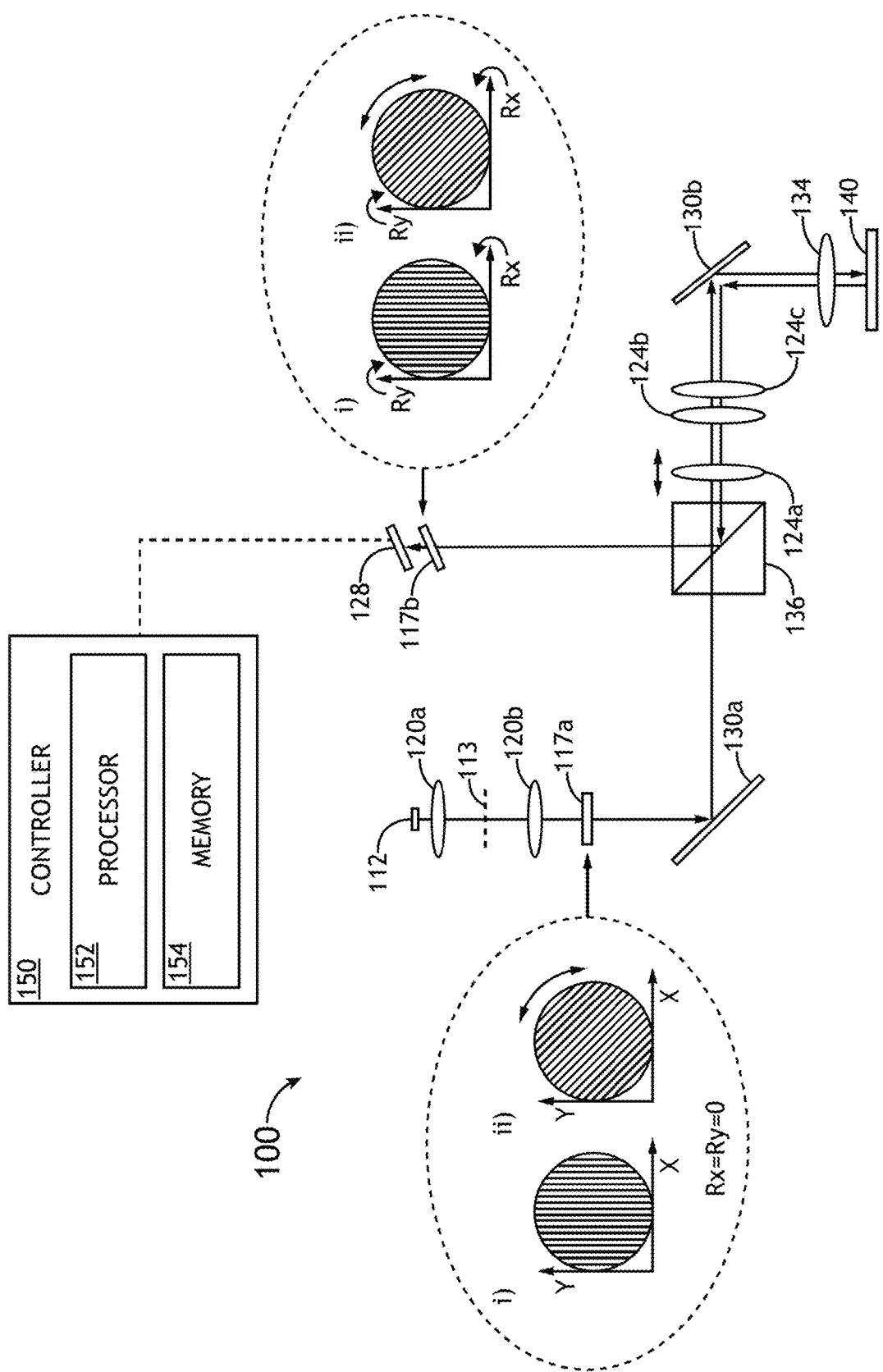

FIG. 18 is a schematic view of an optical characterization system 100. The components described with respect to FIG. 18 may be substantially identical to the similarly named components described with respect to FIG. 1. The system 100 as shown in FIG. 18 may include an illumination source 112, lenses 120a-b, a pupil 113, slit devices 117a-b, lenses 124a-c and lens 134, a beam splitter 136a, mirrors 130a-b, a sample 140, and a detector 128. In this embodiment, the slit device 117a in the illumination path may be perpendicular with respect to the optical axis and the slit device 117b in the collection path may be tilted with respect to the optical axis. Each of the slit devices 117a-b may comprise a single slit or an array of slits. As shown, the orientation of the slits in their normal or tilted plane may be rotated to be in or out of alignment with features on the sample 140 (e.g., wafer).

Figure 19:
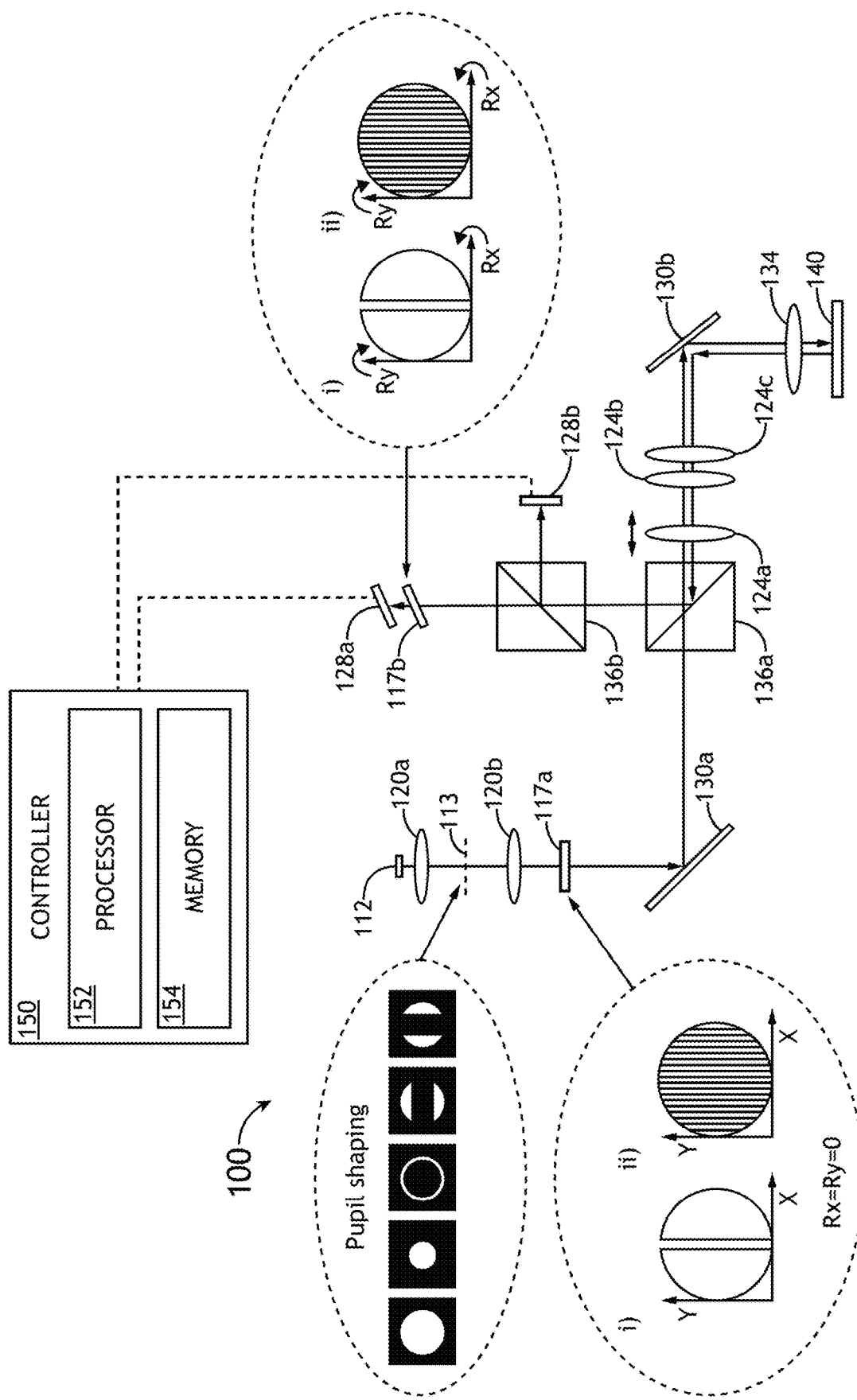

FIG. 19 is a schematic view of an optical characterization system 100. The components described with respect to FIG. 19 may be substantially identical to the similarly named components described with respect to FIG. 1. The system 100 as shown in FIG. 19 may include an illumination source 112, lenses 120a-b, a pupil 113, slit devices 117a-b, lenses 124a-c and lens 134, a beam splitter 136, mirrors 130a-b, a sample 140, and a detector 128. In this embodiment, the slit device 117a in the illumination path may be perpendicular with respect to the optical axis and the slit device 117b in the collection path may be tilted with respect to the optical axis. Each of the slit devices 117a-b may comprise a single slit (i) or an array of slits (ii). As shown, an aperture at the pupil 113 may have broad, narrow, or oblique illumination profiles (depending on the desired resolution or illumination). The aperture at the pupil 113 may be a full open aperture, a half open aperture, a ring aperture, or a center blocked aperture (as shown in FIG. 9A). Additionally, the aperture at the pupil 113 may have a soft transition (i.e., apodization) instead of a knife edge to reduce side lobes of through-focus curves (as shown in FIG. 9B).

Figure 20:
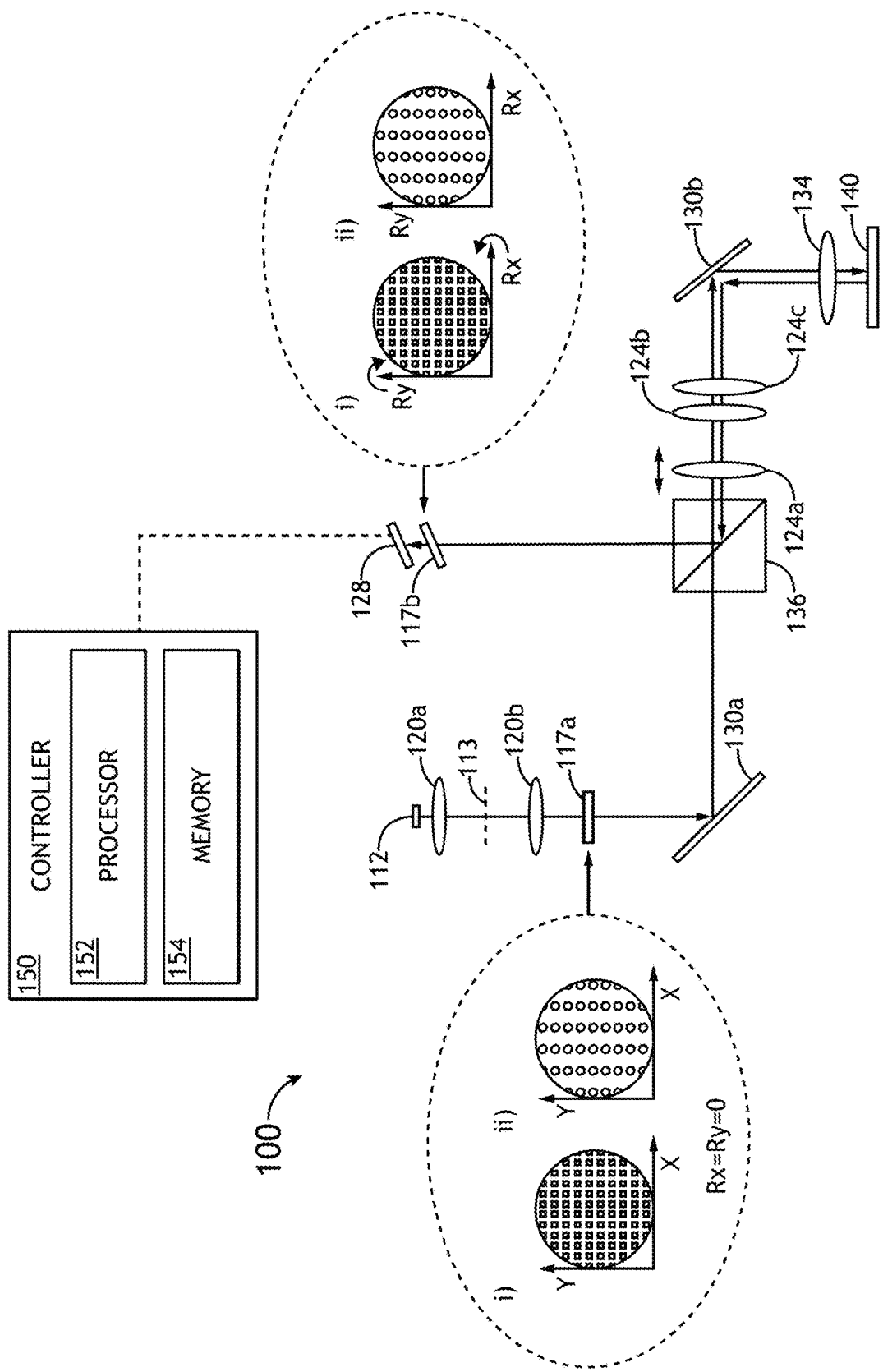

FIG. 20 is a schematic view of an optical characterization system 100. The components described with respect to FIG. 20 may be substantially identical to the similarly named components described with respect to FIG. 1. The system 100 as shown in FIG. 20 may include an illumination source 112, lenses 120a-b, a pupil 113, slit devices 117a-b, lenses 124a-c and lens 134, a beam splitter 136, mirrors 130a-b, a sample 140, and a detector 128. In this embodiment, the slit device 117a in the illumination path may be perpendicular with respect to the optical axis and the slit device 117b in the collection path may be tilted with respect to the optical axis. In this embodiment, each of the slit devices 117a-b may comprise pinholes (or an array of pinholes) instead of slits. Each of the pinholes may be square shaped, rectangular shaped, or circular. Using pinholes instead of slits may increase the resolution while decreasing illumination.

All of the methods described herein may include storing results of one or more steps of the method embodiments in memory. The results may include any of the results described herein and may be stored in any manner known in the art. The memory may include any memory described herein or any other suitable storage medium known in the art. After the results have been stored, the results can be accessed in the memory and used by any of the method or system embodiments described herein, formatted for display to a user, used by another software module, method, or system, and the like. Furthermore, the results may be stored "permanently," "semi-permanently," temporarily," or for some period of time. For example, the memory may be random access memory (RAM), and the results may not necessarily persist indefinitely in the memory.

It is further contemplated that each of the embodiments of the method described above may include any other step(s) of any other method(s) described herein. In addition, each of the embodiments of the method described above may be performed by any of the systems described herein.

One skilled in the art will recognize that the herein described components operations, devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components, operations, devices, and objects should not be taken as limiting.

As used herein, directional terms such as "top," "bottom," "over," "under," "upper," "upward," "lower," "down," and "downward" are intended to provide relative positions for purposes of description, and are not intended to designate an absolute frame of reference. Various modifications to the described embodiments will be apparent to those with skill in the art, and the general principles defined herein may be applied to other embodiments.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected," or "coupled," to each other to achieve the desired functionality, and any two components capable of being so associated can also be viewed as being "couplable," to each other to achieve the desired functionality. Specific examples of couplable include but are not limited to physically mateable and/or physically interacting components and/or wirelessly interactable and/or wirelessly interacting components and/or logically interacting and/or logically interactable components.

Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," and the like).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, and the like" is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, and the like). In those instances where a convention analogous to "at least one of A, B, or C, and the like" is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, and the like). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. An optical characterization system, comprising:
   an illumination source;
   a set of illumination optics in an illumination path configured to illuminate a sample with illumination from the illumination source;
   a set of collection optics in a collection path;
   a first slit device in the illumination path located at a first plane conjugate to the sample;
   a second slit device in the collection path located at a second plane conjugate to the sample, wherein at least one of the first slit device is tilted with respect to an optical axis of the illumination path or the second slit device is tilted with respect to an optical axis of the collection path;

at least one detector configured to generate an image of the sample, wherein the image includes data associated with the first slit device and the second slit device; and a controller configured to be communicatively coupled with the at least one detector, the controller including one or more processors configured to execute program instructions causing the one or more processors to:

receive through-focus information from the data associated with the first slit device and the second slit device, and provide corrective motion to a stage holding the sample to maintain a position of the sample at a selected focus.

2. The optical characterization system of claim 1, wherein at least one of the first slit device is normal with respect to the optical axis of the illumination path or the second slit device is normal with respect to the optical axis of the collection path.

3. The optical characterization system of claim 1, wherein the selected focus is at a focus offset of zero or a selected non-zero value.

4. The optical characterization system of claim 1, wherein an aperture placed at a pupil in the illumination path comprises a full open aperture, a half open aperture, a ring aperture, a center blocked aperture, a dipole aperture, or a slit aperture.

5. The optical characterization system of claim 1, wherein the sample is a semiconductor wafer, a reticle, or a photomask.

6. The optical characterization system of claim 1, wherein the set of illumination optics comprises:

at least one of a lens, a mirror, a beam splitter, or a prism mirror.

7. The optical characterization system of claim 1, wherein the set of collection optics comprises:

at least one of a lens, a mirror, a beam splitter, or a prism mirror.

8. The optical characterization system of claim 1, wherein at least one of the first slit device or the second slit device comprises a single slit.

9. The optical characterization system of claim 1, wherein at least one of the first slit device or the second slit device comprises an array of slits.

10. The optical characterization system of claim 1, wherein the at least one detector comprises a 1-D array.

11. The optical characterization system of claim 1, wherein the at least one detector comprises a 2-D camera.

12. The optical characterization system of claim 11, wherein the controller causes the one or more processors to receive the image from the 2-D camera and bin the image to select columns of pixels in the image.

13. The optical characterization system of claim 12, wherein the columns of pixels have an adjustable number of pixels.

14. The optical characterization system of claim 1, wherein the at least one detector comprises a first detector and a second detector.

15. The optical characterization system of claim 14, wherein a beam splitter splits the collection path between a first channel and a second channel, the first channel includes the second slit device and the first detector, and the second channel includes the second detector.

16. The optical characterization system of claim 15, wherein the first channel corresponds to a first field of view of the image, and the second channel corresponds to a second field of view of the image.

17. The optical characterization system of claim 1, comprising a movable focusing lens configured to increase a range of a focus offset.

18. The optical characterization system of claim 1, wherein the first slit device and the second slit device each comprise an array of pinholes.

19. An optical characterization method, comprising:

receiving through-focus information from an image of a sample generated by at least one detector of an optical characterization subsystem, wherein the optical characterization subsystem comprises:

an illumination source, a set of illumination optics in an illumination path configured to illuminate the sample with illumination from the illumination source, a set of collection optics in a collection path, a first slit device in the illumination path located at a first plane conjugate to the sample, a second slit device in the collection path located at a second plane conjugate to the sample, wherein at least one of the first slit device is tilted with respect to an optical axis of the illumination path or the second slit device is tilted with respect to an optical axis of the collection path, the at least one detector configured to generate the image of the sample, wherein the image includes data associated with the first slit device and the second slit device; and providing corrective motion to a stage holding the sample to maintain a position of the sample at a selected focus.

20. The method of claim 19, wherein at least one of the first slit device is normal with respect to the optical axis of the illumination path or the second slit device is normal with respect to the optical axis of the collection path.

21. The method of claim 19, wherein the selected focus is at a focus offset of zero or a selected non-zero value.

22. The method of claim 19, wherein an aperture placed at a pupil in the illumination path comprises a full open aperture, a half open aperture, a ring aperture, a center blocked aperture, a dipole aperture, or a slit aperture.

23. The method of claim 19, wherein the sample is a semiconductor wafer, a reticle, or a photomask.

24. The method of claim 19, wherein the set of illumination optics comprises:

at least one of a lens, a mirror, a beam splitter, or a prism mirror.

25. The method of claim 19, wherein the set of collection optics comprises:

at least one of a lens, a mirror, a beam splitter, or a prism mirror.

26. The method of claim 19, wherein at least one of the first slit device or the second slit device comprises a single slit.

27. The method of claim 19, wherein at least one of the first slit device or the second slit device comprises an array of slits.

28. The method of claim 19, wherein the at least one detector comprises a 1-D array.

29. The method of claim 19, wherein the at least one detector comprises a 2-D camera.

30. The method of claim 29, wherein receiving through-focus information from the image of the sample further comprises receiving the image from the 2-D camera and binning the image to select columns of pixels in the image.

31. The method of claim 30, wherein the columns of pixels have an adjustable number of pixels.

32. The method of claim 19, wherein the at least one detector comprises a first detector and a second detector.

33. The method of claim 32, wherein a beam splitter splits the collection path between a first channel and a second channel, the first channel includes the second slit device and the first detector, and the second channel includes the second detector.

34. The method of claim 19, comprising a movable focusing lens configured to increase a range of a focus offset.

35. The method of claim 19, wherein the first slit device and the second slit device each comprise an array of pinholes.

\* \* \* \* \*